United States Patent [19]
Hirota et al.

[11] Patent Number: 6,118,895
[45] Date of Patent: *Sep. 12, 2000

[54] IMAGE FORMING APPARATUS FOR DISTINGUISHING BETWEEN TYPES OF COLOR AND MONOCHROMATIC DOCUMENTS

[75] Inventors: Yoshihiko Hirota; Katsuhisa Toyama; Takayuki Nabeshima, all of Toyokawa, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/611,473

[22] Filed: Mar. 5, 1996

[30] Foreign Application Priority Data

| Mar. 7, 1995 | [JP] | Japan | 7-047301 |
| Mar. 7, 1995 | [JP] | Japan | 7-047321 |
| Feb. 15, 1996 | [JP] | Japan | 8-028063 |

[51] Int. Cl.$^7$ ............................................. H04N 1/54
[52] U.S. Cl. .................... 382/165; 382/171; 382/176; 358/522; 358/529
[58] Field of Search .................... 358/515, 521, 358/522, 462, 529, 530, 532, 523; 382/170, 171; H04N 1/54

[56] References Cited

U.S. PATENT DOCUMENTS

| 5,220,620 | 6/1993 | Nakano et al. | 358/520 |
| 5,287,204 | 2/1994 | Koizumi et al. | 358/530 |
| 5,289,296 | 2/1994 | Yamada | 358/530 |
| 5,357,354 | 10/1994 | Matsunawa et al. | 358/530 |
| 5,408,343 | 4/1995 | Sugiura et al. | 358/520 |
| 5,581,375 | 12/1996 | Ma | 358/529 |
| 5,592,310 | 1/1997 | Sugiura | 358/523 |
| 5,612,793 | 3/1997 | Ito et al. | 358/522 |
| 5,786,906 | 7/1998 | Shihizuka | 358/522 |

FOREIGN PATENT DOCUMENTS 557 099 A1  8/1993  European Pat. Off. .

*Primary Examiner*—Kim Yen Vu
*Attorney, Agent, or Firm*—Sidley & Austin

[57] ABSTRACT

In a digital full color copying machine, image signals of red, green and blue are converted to a value signal, and histograms of the value signal for chromatic dots and achromatic dots respectively are generated. Then, a document type, such as a color standard document, a color photograph document, a color standard document having a colored background, a black-and-white standard document, or a black-and-white photograph document, is determined automatically based on the histograms. Background level of a copy is controlled automatically at an appropriate level both for a color document and for a black-and-white document having a white background according to the document type by gradation correction of the value signal. Thus, background processing is performed irrespective of a color document or a black-and-white document.

26 Claims, 14 Drawing Sheets

You may copy.

Magnification : ×1.000

| | | Dark | | | | | | | Light |
|---|---|---|---|---|---|---|---|---|---|
| YES | ☐ | | | | | | | | |
| NO | ☐ | +2 | | 0 | | | | | −5 |
| | | ☐ | ☐ | ☐ | ☐ | ☐ | ☐ | ☐ | ☐ |

Paper : ☐ Automatic paper select
☐ Automatic magnification select
☐ Manual

Document mode : ☐ Automatic color selection
☐ Color standard ☐ Black standard
☐ Color photograph ☐ Black photograph Connection to external : YES ☐ C,M,Y,Bk color resolution copy ☐
NO ☐ Bk one color resolution copy ☐

IMAGE FORMING APPARATUS FOR DISTINGUISHING BETWEEN TYPES OF COLOR AND MONOCHROMATIC DOCUMENTS

BACKGROUND OF THE INVENTION

1. Field of the Invention

The present invention relates to a full color digital image forming apparatus such as a full color copying machine.

2. Description of the Prior Art

An image processor which reads a document image is provided in a full color digital image forming apparatus such as a full color digital copying machine or connected to a digital printer, and it processes a digital document image for reproduction. A full color digital image forming apparatus is used to reproduce various types of documents such as a full color image, a monochromatic image, a character document, a photograph, a map, a dot image, or a printed photograph. In order to reproduce such documents appropriately, it is desirable to change image processing in the digital image forming apparatus according to the document type. Previously, a user selects document type with an operational panel, and the image processor processes a document image according to the selection.

However, the manual selection is troublesome for a user. Further, if an automatic document feeder is used and documents including various document types are set in the document feeder, manual selection is impossible. In such a case, it is desirable that the image processor determine the document type automatically, and both full color documents and monochromatic color documents have to be dealt in a unified way in the automatic document type.

Previously, automatic exposure (or background deletion) adopted in a conventional copying machine is performed only in a black copy mode because a reproduced color image in a full color copy is affected when automatic exposure is performed on a full color image in full color copy mode. Recently, automatic color selection mode became available in order to improve operation of a color copying machine and to shorten copying time. In the automatic color selection, it is determined if a document put on a platen is a black-and-white document or a color document, and a color image forming operation or a black image forming operation is performed automatically according to the decision. Automatic exposure mode, however, can be adopted automatically only when the document is determined to be a black-and-white document.

However, if automatic exposure mode is selected according to the decision by the automatic color selection, the following problems occur: Although a document such as a printed image of a newspaper or a magazine including color images and black character images is determined as a color document in the automatic color selection, when such a document is copied, it is necessary to prevent reproduction of an unnecessary image on a reverse side of the sheet of the document. Further, a document such as a magazine often has a background having a color such as cream, and when the cream background is reproduced in a color copy of the document, this unnecessarily wastes toner.

Further, the quality of copy is improved recently by using region discrimination such as a region of black characters after extracting features of a document for performing a processing according to the result of the region discrimination. For example, if a region of black characters is detected, edge emphasis may be performed to improve image quality. Even in a full color mode, processing such as black character discrimination is introduced, and a document including color and black images can he reproduced sharply. However, this is not yet complete, so that a user maintains a quality of a copy according to the type of a document determined by the user, not by using the region discrimination. Then, it is needed that a user adjusts an image control manually when a color copy is generated, and this operation is troublesome for a user. Thus, though the automatic color selection is introduced for the ease of a user and for shortening a copying time, it may complicate the operation of a user and increase a copying time. Further, it is a problem that an image adjustment of a color copy and a selection of a document type are difficult. For example, there are various types of documents such as a full color document, a monochromatic document, a character document, a photograph, a map, a dot image document, and a printed photograph. Thus, the image adjustment and the selection of the document type may not result a copy as expected by the user. What is needed is to control background automatically irrespective of the document type in a unified way.

Further, when an automatic document feeder is mounted on a color copying machine, image adjustment cannot be performed if color documents and black-and-white documents are mixed. Then, image adjustment and document mode selection cannot be performed for each document.

SUMMARY OF THE INVENTION

An object of the present invention is to provide an image processor which can determine document types automatically.

Another object of the present invention is to provide an image forming apparatus which can process background and gradation correction for color and black documents automatically and suitably.

In order to solve these problems on automatic image processing, it is needed to take into account a document such as a photograph document which needs no background control or automatic exposure. It is also desirable that gradation correction is performed automatically according to document type in a unified way. The present invention addresses the problems of the prior art by generating a first histogram of achromatic colors and a second histogram of chromatic colors in a document from a value signal obtained by converting the red, green and blue signals. Preferably, histograms are generated on dots which do not exist at edge portions of an image in the document. Then, the document type of the document (a color document or black-and-white document) is determined according to the first and second histograms. The document is determined to be a color document if the ratio of the number of color dots to that of all the dots is larger than a predetermined value, otherwise the document is determined to be a black-and-white document. The determination of the standard document having a white background and a photograph document may be performed by estimating dots in the background according to the histograms. The gradation correction is performed automatically according to the document type according to analysis of the histograms. If a white background is detected by analyzing the histograms, it can be deleted automatically. On the other hand, if the document is determined to be a photograph document according to the histograms, the background is not deleted. As to a color document, a color photograph document and a color standard document having a colored background are determined according to distribution of frequencies in the histogram. If the histogram has a bi-level type distribution, the document is determined to be a color document with a colored background. When an image is formed, the value signal after gradation and color difference signals are converted again to data of red, green and blue, and they are used for image forming.

An advantage of the present invention is that a user need not select a document type because various document types can be determined automatically both on color documents and black-and-white documents.

Another advantage of the present invention is that appropriate image processing in correspondence to document type can be performed when an automatic document feeder is used.

Still another advantage of the present invention is that background processing can be performed both for a color copy and for a black copy automatically without manual instructions by a user.

A further advantage of the present invention is that automatic color selection is compatible with background processing.

A still further advantage of the present invention is that background can be processed automatically even if documents of various types are copied successively.

A yet further advantage of the present invention is that image processing can be performed appropriately by using a histogram on achromatic dots at non-edge portions.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
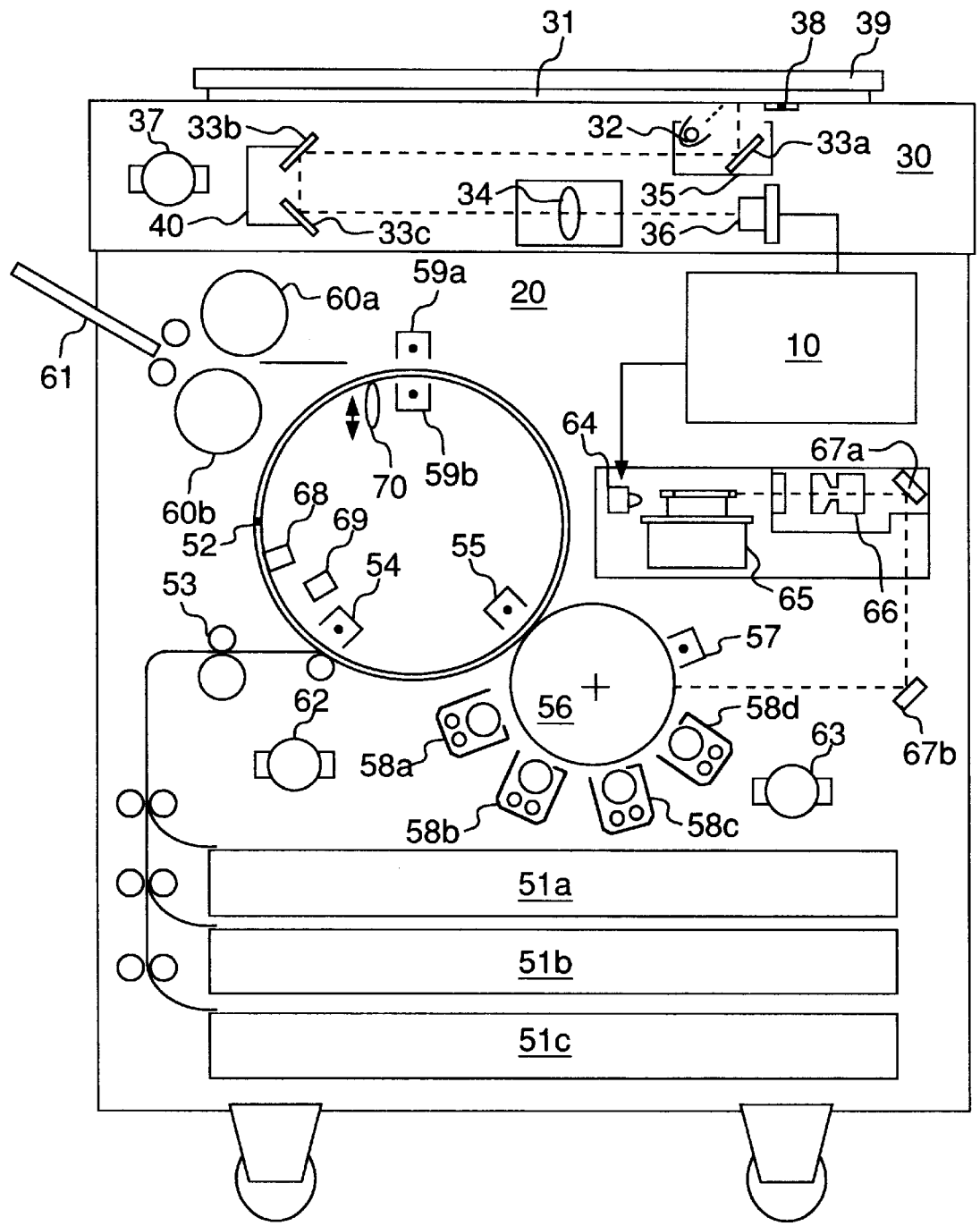
FIG. 1 is a sectional view of a digital color copying machine.

Referring now to the drawings, wherein like reference characters designate like or corresponding parts throughout the drawings, embodiments of the invention is described.

A. Structure of Digital Full Color Copying Machine

FIG. 1 shows a digital full color copying machine comprising an image scanner 30, a signal processor unit 10 and a printer section 20. The image scanner 30 reads a document image and the digital signal processor unit 10 processes the signals read by the image scanner 30. The printer section 20 prints a full color or black image on a paper according to the signals received from the digital signal processor unit 10. An outline of the digital copying machine is explained below.

In the image scanner 30, a document is put on a platen glass 31 and covered with a plate 39, or it is fed onto a platen 31 by an automatic document feeder (not shown) if mounted. A white plate 38 for shading correction is provided at an edge of the platen glass 31. The document is exposed with a lamp 32, and a light reflected from the document is guided through mirrors 33a, 33b and 33c and focused by a lens 34 onto a linear full color sensor (CCD) 36 to be converted to electric signals of components of red, green and blue. The red, green, and blue signals are sent to the signal processor 10. When the document image is read, a first slider 35 and a second slider 40 move at a speed of V and at a speed of V/2 mechanically by a motor 37 along a longitudinal direction perpendicular to an electrical scan direction of the sensor 36 so that the entire document is scanned. The image processor 10 processes the signals electrically to output components of magenta (M), cyan (C), yellow (Y) and black (Bk) and sends them to the printer section 20.

In the printer section 20, the image signals of C, M, Y and Bk received from the image processor 10 are used to drive a laser diode 64, and a laser beam emitted by the laser diode 64 propagates through a polygon mirror 65, an f-θ lens 66, mirrors 67a and 67b to expose a rotating photoconductor drum 56 charged beforehand by a charger 57 so as to form electrostatic latent image. One of four development unit 58a, 58b, 58c and 58d of toners of cyan, magenta, yellow and black is selected to develop the latent image with toners. Next, a sheet of paper supplied from a cassette 51a, 51b or 51c is carried by timing rollers 53 to be wound on a transfer drum 52 with an adsorption charger 54. The paper is then carried further to a transfer portion, and the toner image on the photoconductor drum 56 is transferred by a transfer charger 55 onto the sheet of paper. The above-mentioned printing process are repeated for four colors of yellow, magenta, cyan and black. That is, toner images of four color, cyan, magenta, yellow and black are transferred successively onto the sheet of paper. Then, the paper is separated by separation chargers 59a, 59b and a claw 70 from the transfer drum 52, passes through fixing rollers 60a, 60b for fixing the toner image and is discharged onto a tray 61.

B. Image Signal Processing

Figure 2A:
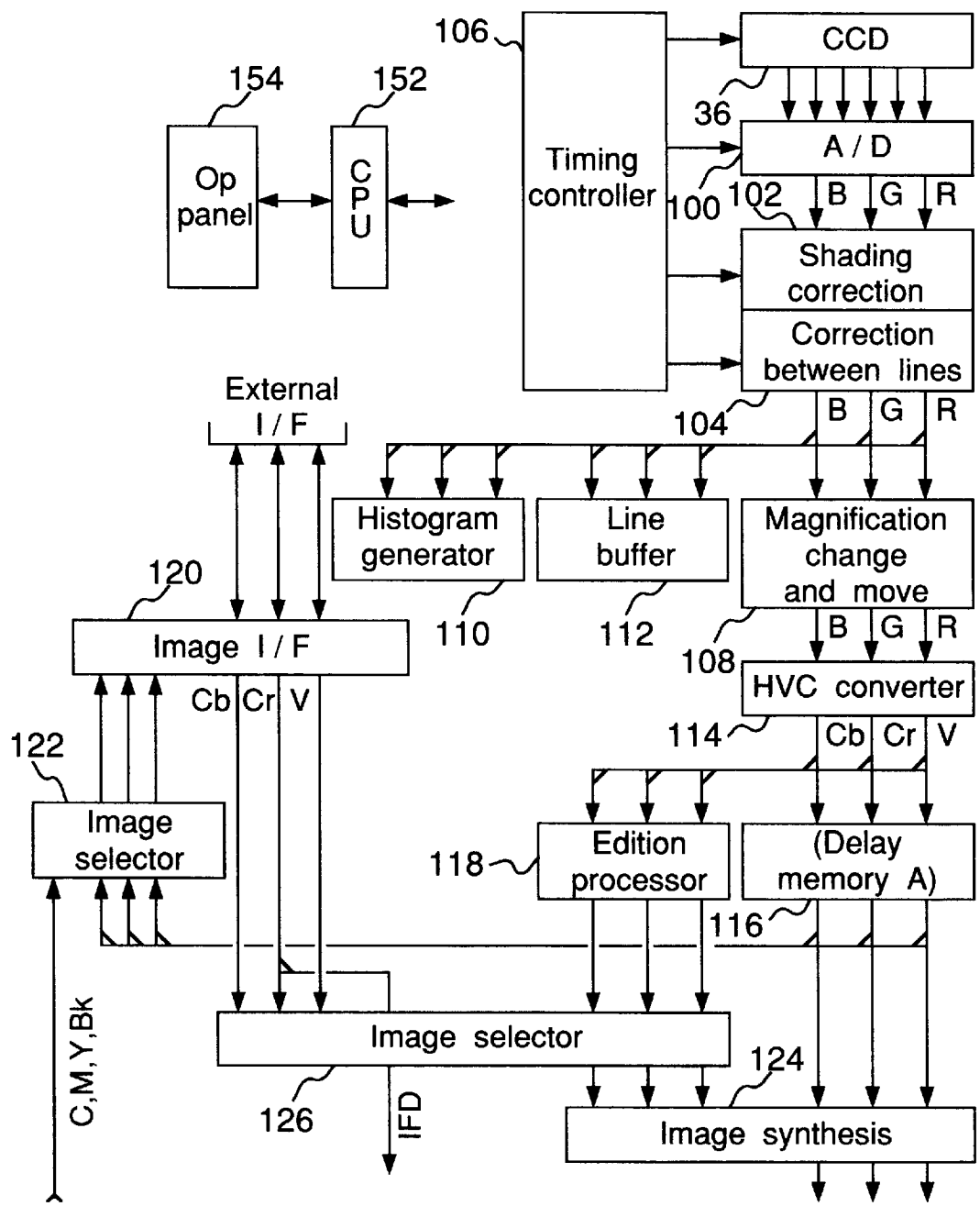
FIGS. 2A and 2B are block diagrams of a signal processor.
Figure 2B:
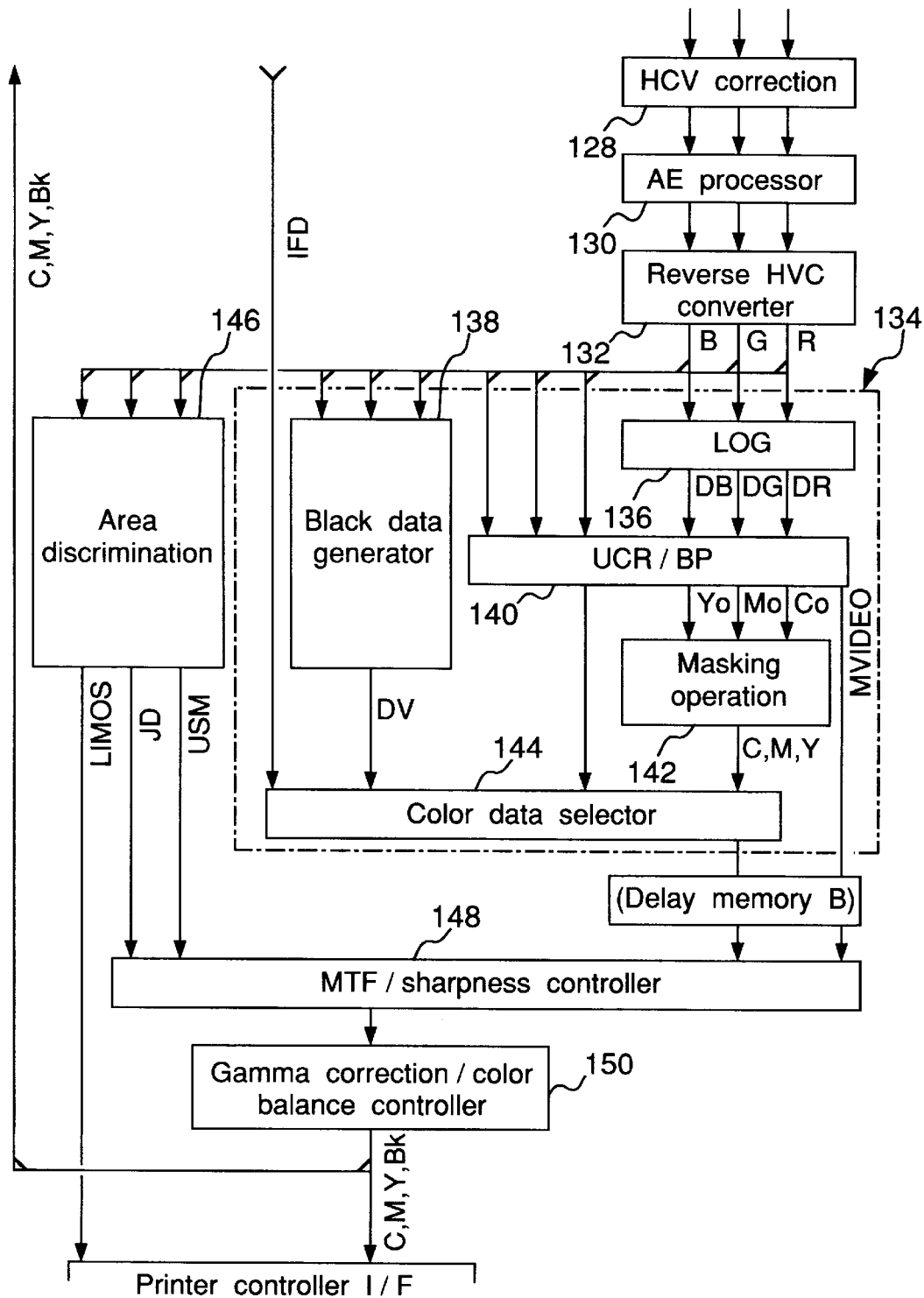

Next, image signal processing in the signal processor 10 is described. FIGS. 2A and 2B show image processing in the signal processor 10. As explained above, the signal processor 10 receives analog image signals of 400 dots per inch of red, green and blue from the linear CCD sensor 36 on which a light reflected from a document focused. In the A/D conversion section 100, the analog image signals are converted to 8-bit digital data (256 gradation levels) of red (R), green (G) and blue (B). In order eliminate scattering of reading of a quantity of light among CCD elements in the sensor 36 along a main scan direction for each of red, green and blue, a shading correction section 102 has stored reference data read on the white plate 38 in a memory (not shown), and when a document image is read, the data in the memory is converted to an inverted value thereof, and it is multiplied with data from the document for shading correction. Next, a line correction section 104 adjusts the output of the data after shading correction according to positions of chips of red, green, and blue provided in the color CCD sensor 36. A timing controller 106 controls timings for the CCD sensor 36, the A/D conversion section 100, the shading correction section 102 and the line correction section 104. Then, the line correction section 104 sends the R, G and B data to line buffer 112 and a histogram generator 110.

The magnification change and move section 108 has two linear memories, and magnification change and movement of data along a main scan direction along the CCD sensor 36 are controlled by changing timings of write and read to and from the memories.

The histogram generator 110 (show in detail in FIG. 4) generates value signals from the R, G and B data obtained in a prescan to generate histograms. By using the histograms of the value signals, automatic color selection, background level and document mode are set automatically. The histogram generator 110 will be explained in detail later.

An HVC converter 114 converts the R, G and B data to value signals (V) and color difference signals (Cr and Cb). An edition processor 118 performs edition such as color change on the data received from the HVC converter 114 according to an instruction from an editor provided as an option.

Next, an image interface 120 receives V, Cr and Cb data through an image selector 122 and sends the image data to an external piece of equipment, or it receives image data from the external equipment. In order to deal with various types of image data, the image interface 120 has a function to convert the V, Cr and Cb data to R, G and B signals, X, Y and Z signals, L*, a* and b* signals or the like, and vice versa. Further, C, M, Y and Bk data to be printed to the printer section 20 may be sent to the external equipment, and vice versa.

An image synthesis section 124 selects the V, Cr and Cb data received from the editor 118 or from the image selector 126 through the image interface 120, and performs image synthesis of the data with other data received from the HVC converter 114.

An HVC corrector 128 (FIG. 2B) corrects the V, Cr and Cb data received from the image synthesis section 124 according to an instruction given with an operational panel 154, in order to adjust image quality by a user in correspondence to three human senses of value (V), hue (H) and chroma (C).

An automatic exposure processor 130 controls the background level of a document on value signals according to information obtained by the histogram generator 110, as will be explained in detail later.

A reverse HVC converter 132 converts the V, Cr, and Cb data again to R, G and B data.

In a color correction section 134, a LOG corrector 136 converts the R, G and B data received from the reverse HVC converter 132 to density data DR, DG and DB, while a monochromatic data generator 138 generates value data from the R, G and B data in a color copy mode and generates gradation data DV for a monochromatic copy in a black copy mode. An under color/black paint section 140 calculates a difference between a maximum and a minimum of the density data DR, DG and DB as color information and a minimum among DR, DG and DB as a black component. The DR, DG and DB data are subtracted by the minimum to generate cyan, magenta and yellow data Co, Mo and Yo, while black data Bk is generated based on the minimum is sent to a color data selector 144. A masking operation section 142 converts the data Co, Mo and Yo to cyan, magenta and yellow data C, M and Y for color reproduction in the printer section 20, and sends them to the color data selector 144.

On the other hand, a region discrimination section 146 discriminates a black character image, a dot image and the like, and generates a result (JD signal) and a correction signal (USM signal) based on the minimum MIN (R, G, B) and a difference between the maximum and the minimum (MAX(R, G, B)−MIN(R, G, B)). Further, a LIMOS signal is sent to the printer section 20 to define a duty ratio of an output period to a pixel period. The output period means a period when a signal is output. The LIMOS signal is set to improve compatibility of reproduction of black characters and granularity of toner image.

An MTF correction/sharpness control section 148 performs various processing such as edge emphasis or smoothing on the data according to results obtained by the image discrimination section 146 for correcting a copy image appropriately.

A gamma correction/color balance section 150 controls a gamma curve (gradation correction curve) and color balance of C, M, Y and Bk data automatically or according to instruction given by the operational panel 154. Then, the C, M, Y and Bk data and the LIMOS signal are sent to the printer section 20.

A CPU 152 controls the signal processor 10, and the operational panel 154 is used to give data and to display data.

C. Copy Mode

Figure 3:
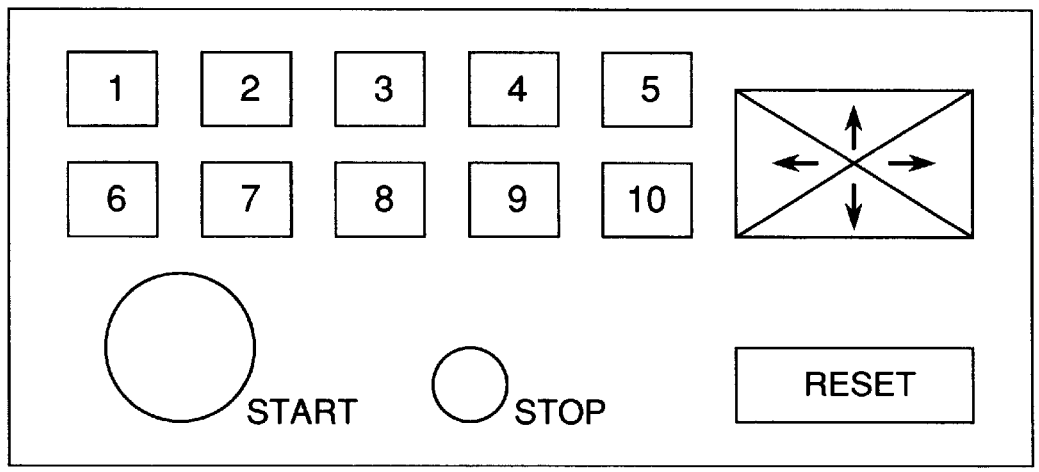
FIG. 3 is a diagram of a basic picture in an operational panel.

Next, copy modes of the full color copying machine are explained. FIG. 3 shows a basic picture in the operational panel 154, and a user can set various copy modes and the like.

First, background processing (automatic or manual) is explained. Background processing can be set as automatic exposure (AE) or manual setting wherein one of eight levels is set. In the automatic exposure, five following types of documents can be distinguished according to a histogram obtained by a prescan: color standard (white background, color background), color photograph, black-and-white standard, black and-white photograph. Then, if the document type is determined to be a black-and-white standard document or a color standard (white background) document, value gradation correction to be explained later (FIGS. 11 and 12) is performed, otherwise a central level of the manual setting is selected as a default automatically (refer to Table 1). When manual setting is performed, contents as shown in Table 2 are set.

Next, document mode is explained (refer also to Table 1). A user can select automatic color selection (ACS) mode or one of four document modes. When ACS mode is selected, one of the four document modes is selected automatically according to the determination of document type based on prescan data, as shown in Table 1. When the document is determined to be a black-and-white document in the automatic color selection, black-and-white standard or photograph mode is selected and a copy is produced with a black copy mode. When the document is determined to be a color document, color standard or photograph mode is selected, and a copy is produced with a full color copy mode of four colors of cyan, magenta, yellow and black. When black-and-white standard-or photograph mode is selected automatically or manually, the display in the operational panel is changed to a display for black-and-white mode (not shown), and a user selects a mixing ratio of R, G and B data as a document parameter in order to determine gradation data. (As a default data, average sensitivity distribution of red, green and blue is set for the ACS mode, while luminous efficiency is set as a default for the manual mode.) Further, a reproduction color can be selected among sixteen colors including black.

Though detailed explanation is omitted, a color resolution mode for reproducing C, M, B or Bk data in color copy mode or for reproducing Bk data in black copy mode for each document can be set.

D. Prescan and Generation of Histograms

In this embodiment, prescan is performed for determining document type and for performing automatic exposure (AE) and automatic color selection (ACS) according to the result of document type. The scan unit 35 in the image scanner 30 is positioned near the white plate 38 for shading correction opposite to a document reference position for normal scan, in order to shorten the first copy time. When the start button in the operational panel 154 is pressed, the light source 32 is turned on, and the scanner 30 scans the white plate 38 and scans a document to generate histogram data thereof. Then, the scanner returns to the document reference position. As will be explained later, automatic exposure (AE) and automatic color selection (ACS) are determined according to the generated histogram data, and a normal scan is started.

Figure 4:
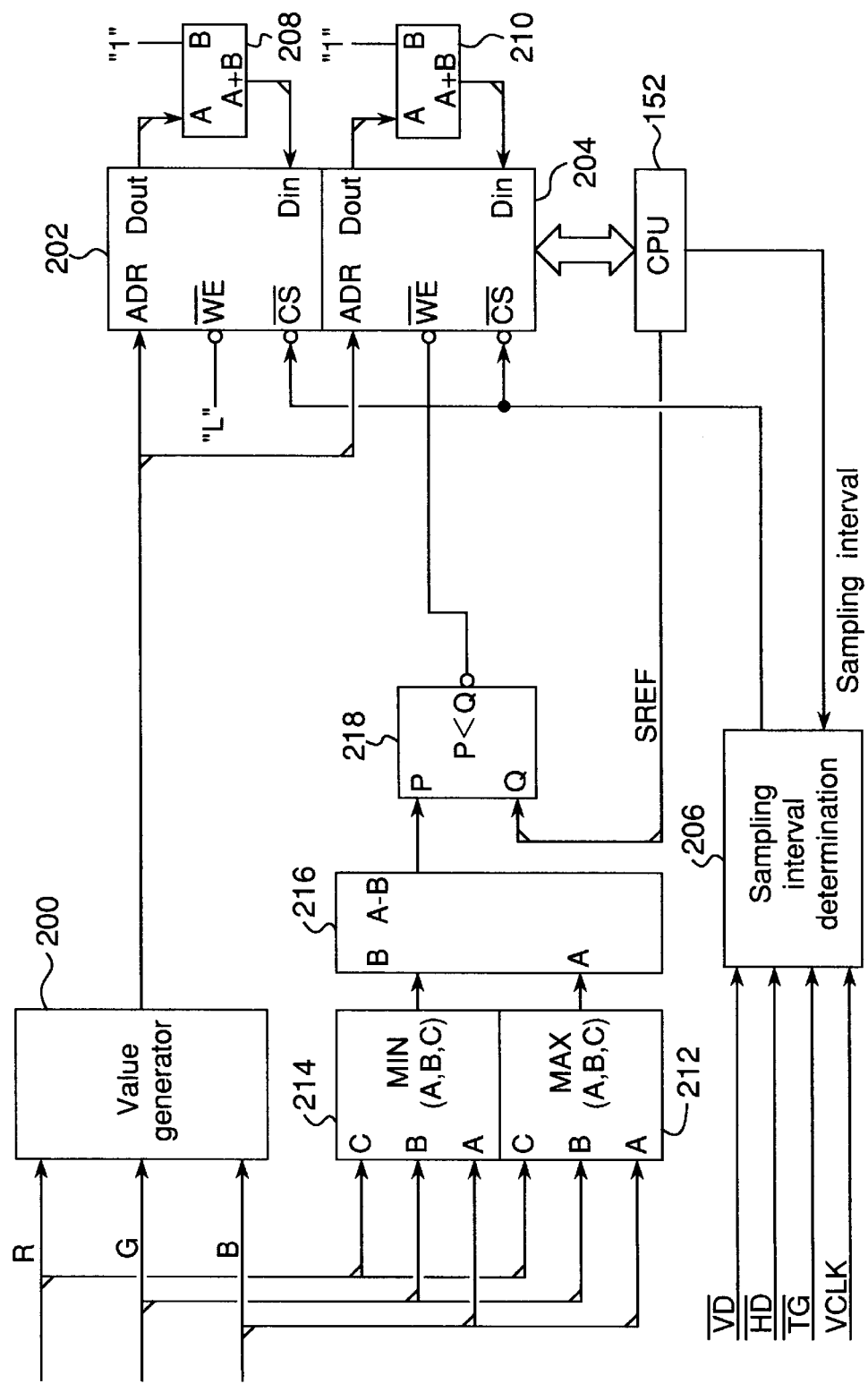
FIG. 4 is a block diagram of a histogram generator.

Next, generation of histograms in a prescan is explained. FIG. 4 shows the histogram generator 110 which generates histograms in a document area in a prescan. The histogram generator 110 has first and second histogram memories 202 and 204, and before a prescan, the two histogram memories 202 and 204 are initialized by writing "0" thereto at addresses of gradation levels of 0–255. In the histogram generator 110, a value generator 200 receives the 8-bit R, G and B data and converts them to a value signal VH according to a following equation to be sent as an address signal to the first and second histogram memories 202 and 204:

$$VH = 0.31640625*R + 0.65625*G + 0.02734375*B \quad (1)$$

The value signal VH obtained resembles human sensitivity for observing an object. As explained above, the value data VH is used instead of the R, G and B data because the value data are used in the automatic exposure processing, as will be explained later.

Figure 5:
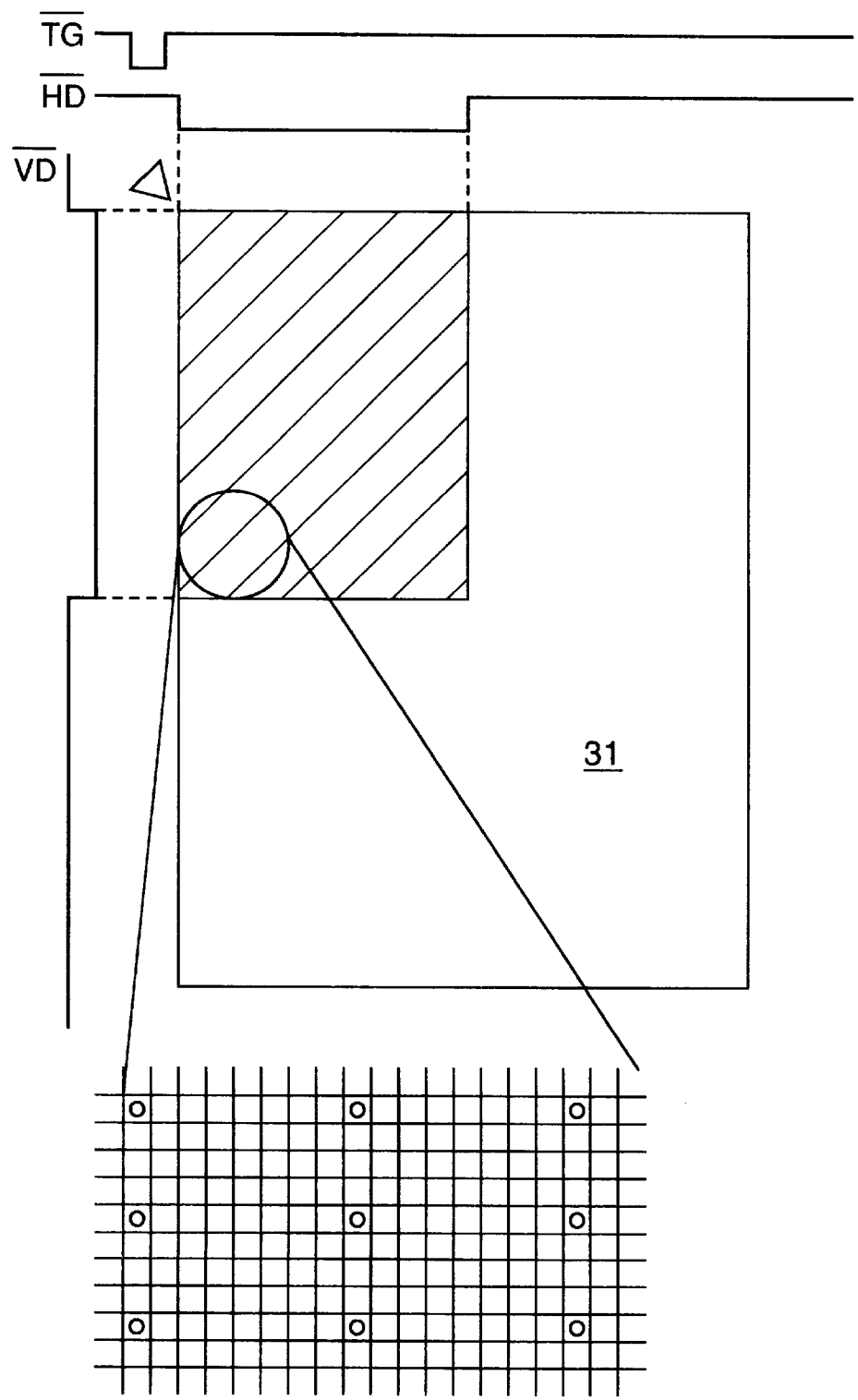
FIG. 5 is a diagram for illustrating sampling in generating a histogram.

A sampling interval circuit 206 determines intervals (a thinning out ratio) for storing data in the histogram memories 202 and 204. This sampling is performed to reduce a memory capacity for prescan. If a histogram of all dots in a maximum document size of A3 is generated, a memory capacity of 32 megabits is needed. Then, in order to reduce the memory capacity to 1 megabits, data are sampled in this example for every eight dots along the main scan direction and for every four dots along the subscan direction for a document 31, as shown in FIG. 5. In FIG. 5, dots denoted with circles are sampled in an effective document area represented with hatching.

A document size has been detected before a prescan, and the sampling interval circuit 206 receives various signals for sampling from the timing controller 106. Among the signals, signals $\overline{HD}$ and $\overline{VD}$ are generated in a document area along the main scan direction and along the subscan direction. Then, the sampling interval circuit 206 allows generation of a histogram only in the document area determined by the signals $\overline{HD}$ and $\overline{VD}$. A signal TG denotes a synchronous clock signal along the main scan direction, and it is generated for each line. A signal VCLK denotes a synchronization clock signal of image data.

As to the histogram memories 202 and 204, a read modify write cycle is performed for a period of eight dots. An address ADR of the histogram memory 202, 204 corresponds to a data value (value gradation level), while data at the address represents the frequency of occurrence of each gradation level. When an address ADR is sent to the histogram memories 202, 204 data (frequency) at the address are read, and they are incremented by adders 208, 210 by one. The sums are written to the histogram memories 202, 204 at the same address. After prescan is completed, the CPU 152 reads gradation data from the histogram memories 202 and 204 for various processings such as automatic exposure and automatic color selection to be explained later.

Two histogram memories 202 and 204 are used for automatic color selection and for document type determination. It is noted that data on all the dots can be written to memory 202 because the $\overline{WE}$ input of the first histogram memory 202 is always kept at L level. Thus, the first histogram memory 202 is used to generate a value histogram for a document simply. On the other hand, the second one 204 generates a histogram of achromatic dots in the document. In order to detect an achromatic dot, a minimum circuit 212 and a maximum circuit 214 detect a minimum (MIN) and a maximum (MAX) of input R, G and B data, and a subtraction circuit 216 calculates a difference between them. Then, a comparator 218 compares the difference (MAX−MIN) with a reference level SREF, and if the difference is smaller than the reference level, data is allowed to be written to the third histogram memory 204.

Automatic color selection and document type determination are performed based on first and second histograms generated in the first and second histogram memories 202 and 204. As explained above, the histograms are generated on the value signals sampled in the effective document area; h1(n) denotes a frequency data at a value level n of the first histogram generated by the first histogram memory 202, while h2(n) denotes a frequency data at a value level n of achromatic dots in the second histogram generated by the second histogram memory 204.

Figure 6:
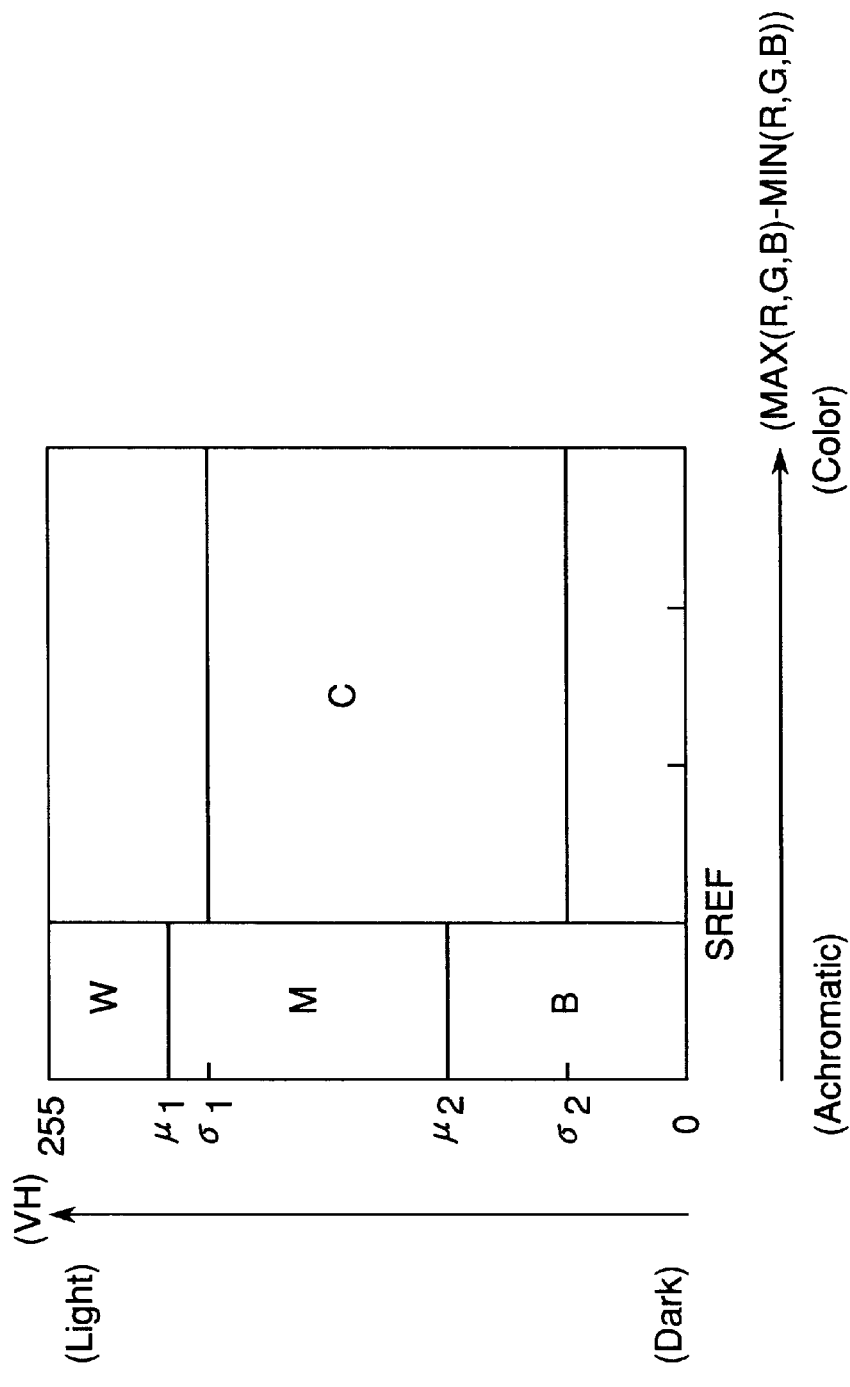
FIG. 6 is a diagram for illustrating various quantities obtained from the histogram.

Many quantities can be derived from the two histograms (h1(n) and h2(n)). Further, the CPU 152 generates a third histogram h3(n)=h1(n)−h2(n) by subtracting a frequency h2(n) of the second histogram memory 204 from a frequency h1(n) of the first histogram memory 202. The third histogram represents a histogram for chromatic dots in a document. As shown in FIG. 6, several quantities can be obtained from the histograms h1(n) and h3(n). A sum W is obtained for levels n between $\mu1$ and 255 from h1(n), and it represents a number of white dots, where a "dot" denotes each area detected by a linear sensor 36 in a document. That is, W denotes a dot number of the white background in a document. A sum M is obtained for levels n between $\mu2$ and $\mu1$ from h1(n), and it represents a number of dots of half-tone (grey) regions. A sum B is obtained for levels n between 0 and $\mu2$ from h1(n), and it represents a number of dots in black areas. A sum C is obtained for levels n between $\sigma2$ and $\sigma1$ from h3(n) because dots of chromatic colors are counted.

$$W = \sum_{n=\mu1}^{255} h1(n), \quad (2)$$

$$M = \sum_{n=\mu2}^{\mu1} h1(n),$$

$$B = \sum_{n=0}^{\mu2} h1(n),$$

$$S = \sum_{n=0}^{255} h1(n),$$

and $$C = \sum_{n=\sigma 2}^{\sigma 1} h3(n),$$

In the automatic color selection, the sum C represents a number of dots in a color area in the document obtained from the second histogram h3(n).

Figure 9:
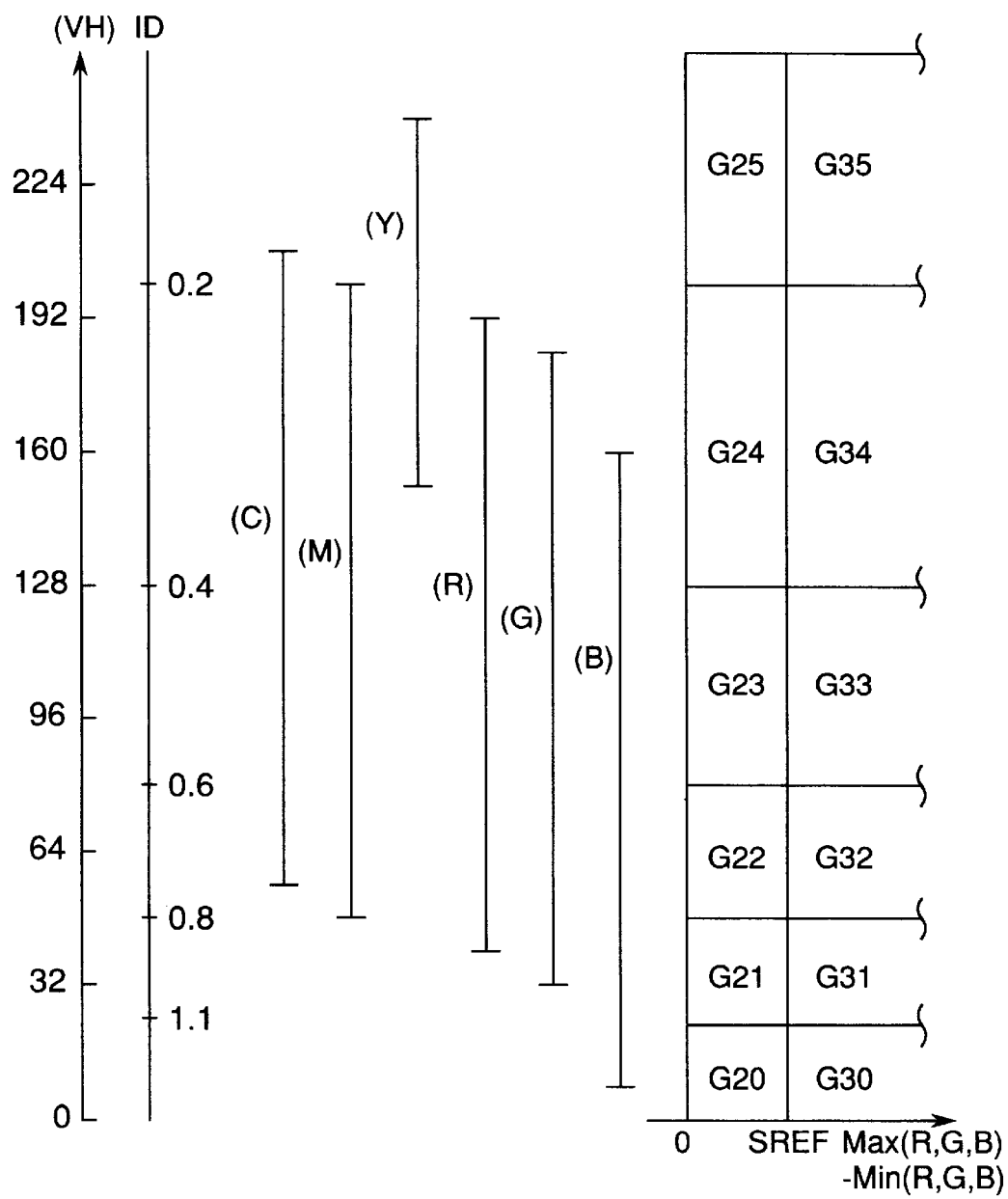
FIG. 9 is a diagram for illustrating value signal and various signals G25–G35.

In the document type determination, as shown in FIG. 9, frequency sums G25–G20 and G35–G30 are obtained in six value ranges from the two histograms h2(n) and h3(n).

E. Automatic Color Selection (ACS)

In the automatic color selection mode, a document put on the platen 31 is discriminated to be a black-and-white document or a color document to determine a copy mode automatically. Then, a color document is subjected to an image forming process of four colors (color copy mode). On the other hand, a black-and-white document is subjected to an image forming process of only black toners (black copy mode), and copy speed is improved. Especially, when an automatic document feeder is used, even if black-and-white documents and color documents are placed in a mixed way, appropriate copying conditions can be set without manual operation by a user.

In the automatic color selection, a document type (black-and-white document or color document) is determined according to a ratio of dots of achromatic color to dots of chromatic color in a document. In concrete, a ratio of a sum C of chromatic dots to a sum S of the total dots obtained from the histogram is used to determine color copy or black copy. As explained above, C denotes a dot number in the color area obtained from h3(n), and S denotes a total number of dots in a document size. Then, the ratio C/S represents a ratio of chromatic color to (chromatic color plus achromatic color). If C/S is smaller than a reference value SREF, black copy mode is selected because there is if any a small part of chromatic color, while if C/S is larger than the reference value SREF, color copy mode is selected because there is a large part of chromatic color. By using S as a denominator, an effect of document size can be neglected in the automatic color selection.

Figure 7:
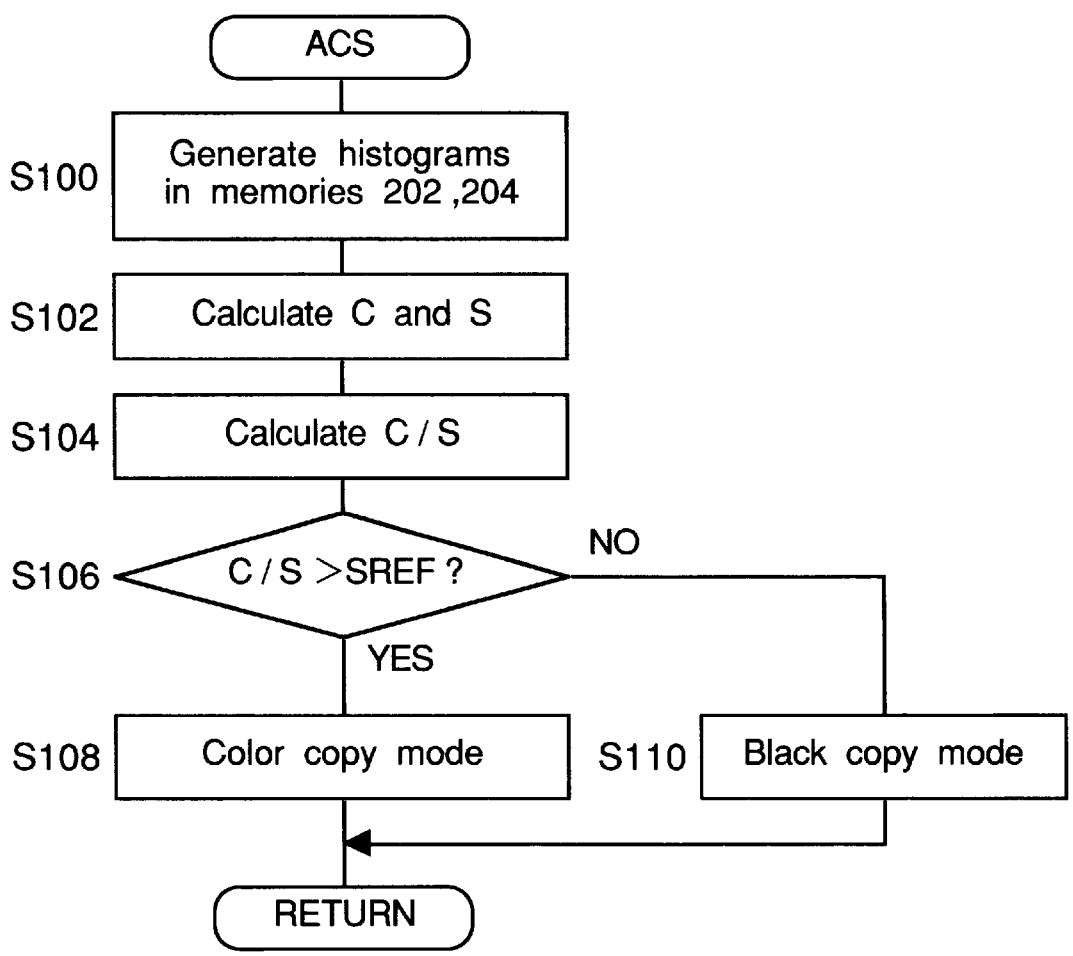
FIG. 7 is a flowchart of automatic color selection.

FIG. 7 shows a flowchart of color selection of the CPU 152. First, the histogram generator 110 generates histograms of value signal in the first and second histogram memories 202 and 204 (step S100). Next, C and S are obtained from the first and second histograms in the memories 202 and 204 (step S102), and a ratio C/S is calculated (step S104). If the ratio C/S is larger than the reference value SREF (YES at step S106), color copy mode is set (step S108), otherwise black copy mode is set (step S110).

F. Determination of Document Type

At a set-up stage of automatic exposure (AE), the CPU 152 determines five document types listed below, according to the information in the histogram memories 202 and 204 and the result of the automatic color selection (ACS) (refer to Table 1).

(1) Black-and-white photograph document: A black-and-white photograph, a black-and-white very precise dot image print, and the like.

(2) Black-and-white standard document: Documents with black characters, black liner images and the like, having a relatively white background.

(3) Color photograph document: A color silver salt photograph, a color image print with very fine dots and the like.

(4) Color standard document (with white background): A document having a relatively white background, including color characters, color linear images.

(5) Color standard document (with colored background): A document having a colored background.

Figure 8:
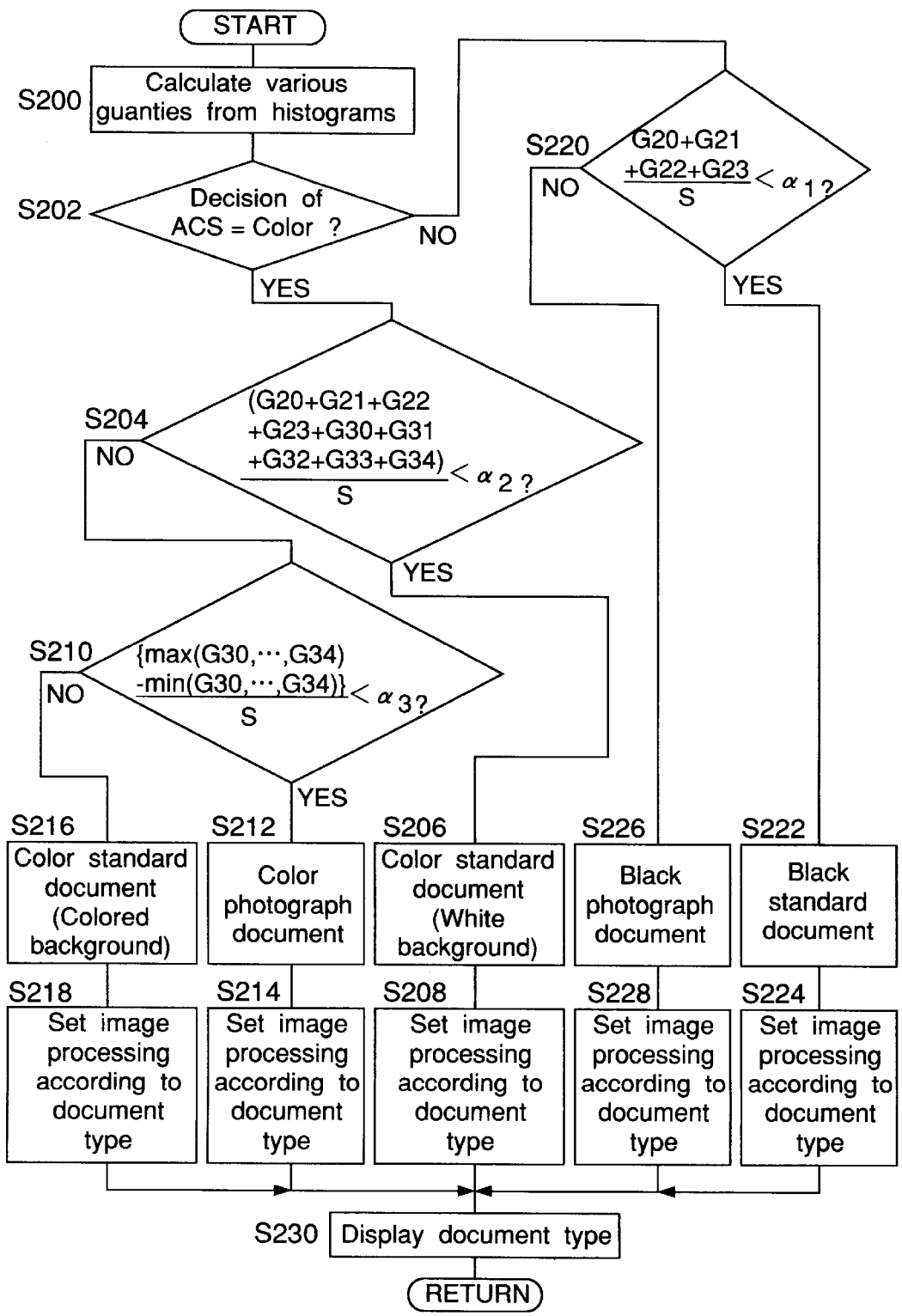
FIG. 8 is a flowchart of decision of document type.
Figure 11:
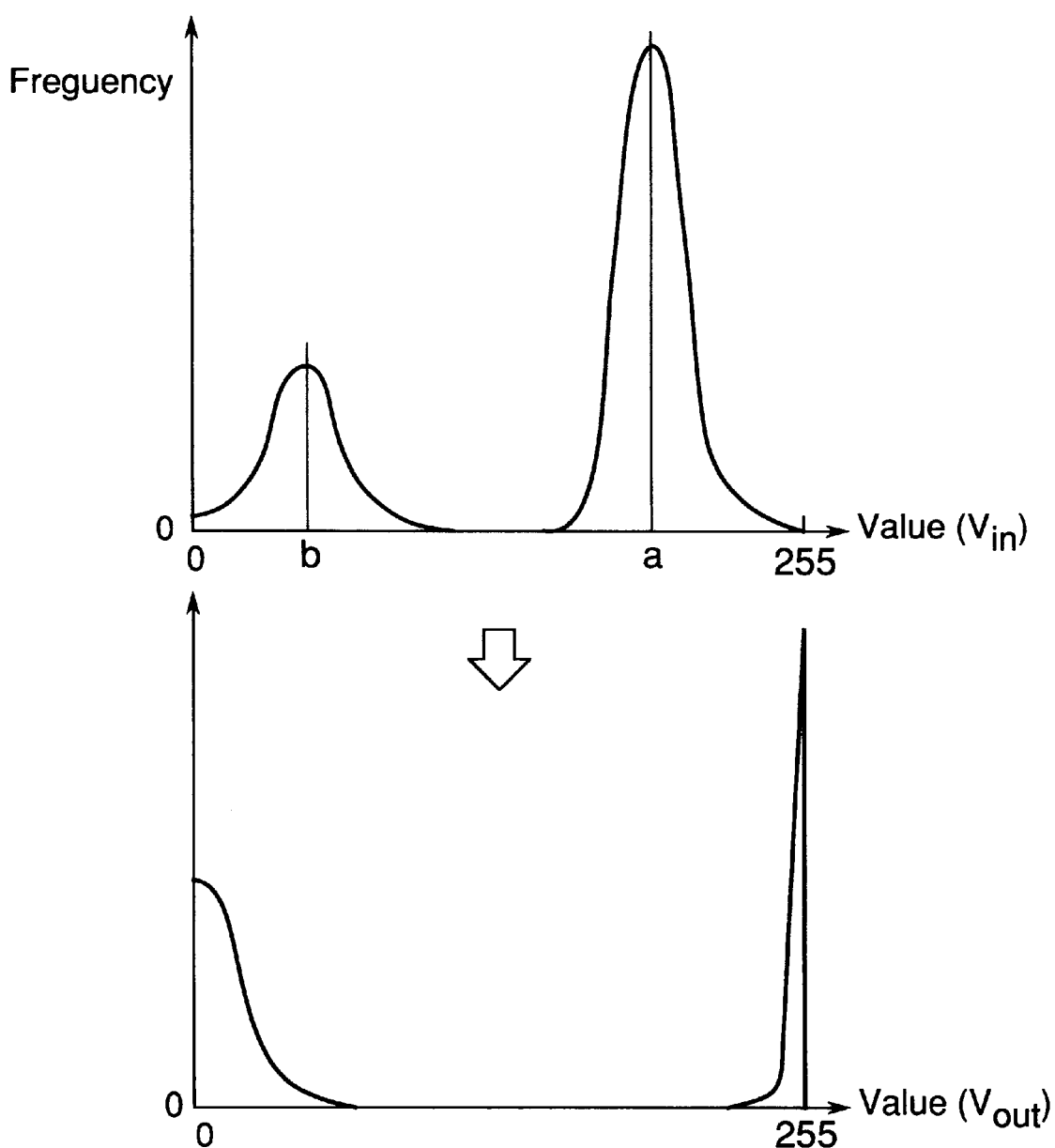
FIG. 11 is a graph of a distribution of value before and after automatic exposure on a monochromatic standard document.
Figure 12:
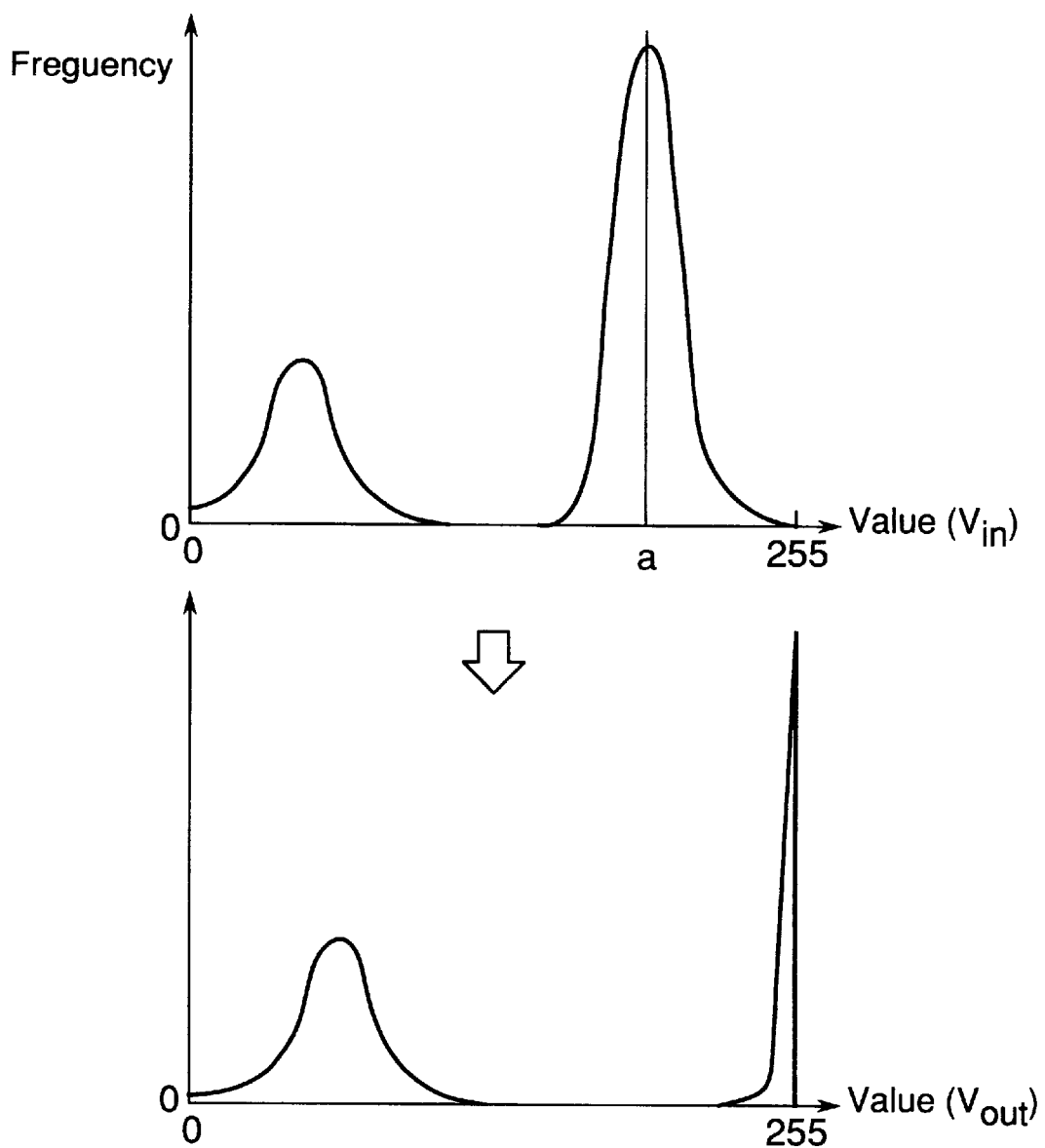
FIG. 12 is a graph of a distribution of value before and after automatic exposure on a color standard document having white background.

The document type determination is also based on the histograms (refer to FIG. 8). The concept of document type determination is explained first. As explained above on the automatic color selection, a color document and a black-and-white document are determined according to the ratio of chromatic dots to achromatic dots. That is, if the ratio is larger than the reference value, the document is determined to be a color document, otherwise it is decided to be a black-and-white document. Further, it is determined from the histograms if the document is a photograph document or a standard one. The standard document denotes a document including mainly characters, and a histogram thereof has a bi-level type distribution, as shown in FIGS. 11 and 12, having frequency peaks near levels 0 and 255. A document which has a colored background is also dealt with in this determination. If the histogram has a bi-level type distribution, the document is determined to be a standard document, otherwise it is determined to be a photograph document. In concrete, a number of dots in a density range at the white side is compared with that except the white side, and if the former is larger than a threshold value, the histogram is determined to have a bi-level type distribution, and the document is determined to be a standard document. This decision is effective for a black-and-white document and a color document having a white background. As to a color document, a standard document having a colored background and a color photograph document have to be discriminated. Then, if the histogram has an average distribution over a wide range, the document is determined to be a color photograph document, otherwise it is determined to be a color standard having a colored background. In concrete, a value signal level (0–255) is divided into a plurality of blocks (for example, six blocks for achromatic dots and for chromatic dots in FIG. 9), and frequency sums in the blocks except one or more blocks near the highest value signal are obtained. Then, a difference between the maximum and the minimum among the sums is calculated, and if the difference is smaller than a threshold value, the document is determined to be a photograph document. Otherwise the document is determined to be a document having a colored background.

FIG. 8 shows a flowchart of determination of document type by the CPU 152. First, various sums G25, G24, G23, G22, G21, G20, G35, G34, G33, G32, G31 and G30 defined below are calculated from frequency data h2(n) and h3(n) for achromatic dots and for chromatic dots. Further, a background level "a" and a character level "b" are calculated (step S200). The background level "a" represents a gradation level at the maximum frequency below 0.4 of output data ID in the second histogram memory 204, and the character level "b" represents a gradation level at the maximum frequency above 0.6 of output data ID in the second histogram memory 204 (refer to examples shown in FIGS. 11 and 12).

$$G_{25} = \sum_{n=200}^{255} h2(n), \quad (3)$$

$$G_{24} = \sum_{n=128}^{199} h2(n),$$

$$G_{23} = \sum_{n=80}^{127} h2(n),$$

-continued $$G_{22} = \sum_{n=48}^{79} h2(n),$$

$$G_{21} = \sum_{n=24}^{47} h2(n),$$

$$G_{20} = \sum_{n=0}^{23} h2(n),$$

$$G_{35} = \sum_{n=200}^{255} h3(n),$$

$$G_{34} = \sum_{n=128}^{199} h3(n),$$

$$G_{33} = \sum_{n=80}^{127} h3(n),$$

$$G_{32} = \sum_{n=48}^{79} h3(n),$$

$$G_{31} = \sum_{n=24}^{47} h3(n),$$

$$G_{30} = \sum_{n=0}^{23} h3(n),$$

As shown in the left side of FIG. 9, levels 0–255 of value VH corresponds to the output data ID. The sums G25, G24, G23, G22, G21, G20, G35, G34, G33, G32, G31 and G30 correspond to sums obtained in six ranges of ID of 0.2 or below, 0.2–0.4, 0.4–0.6, 0.6–0.8, 0.8–1.1., 1.1 or above for the histogram h2(n) and the histogram h3(n). The sums G25, G24, G23, G22, G21, G20 are obtained when the value data of MAX–MIN is smaller than the reference value SREF, otherwise the sums G35, G34, G33, G32, G31 and G30 are obtained. It is to be noted in FIG. 9 that ranges shown with legends C, M, Y, R, G and B denote regions wherein VH data exist for colors of cyan, magenta, yellow, red, green and blue.

Next, in order to discriminate the above-mentioned five document types, a photograph document and a document having a colored background are distinguished. First, the difference is determined according to the result of the automatic color selection described above if the document is a color document (document types (3)–(5)) or a black-and-white document (document types (1)–(2)) (step S202). If the result of the automatic color selection is a color document (YES at step S202), the flow proceeds to step S204 to discriminate color documents (3)–(5) with a reference number α2. Then, if a ratio of a sum of frequencies of achromatic dots of 0.4 or more of output data ID and those of chromatic dots of 0.2 or more thereof to the sum S of total dots is smaller than is α2 (YES at step S204), the document is determined to be a color standard document having a colored background (step S206). The values of 0.4 or 0.2 correspond to ranges of various colors shown in FIG. 9. Alternatively, the former sum or the numerator in the ratio may be replaced with dots in the white background or a sum of frequencies not summed in the former sum. Then, as to image processing, automatic exposure is set, the document mode is set as a color standard mode, black character discrimination is set, and a gradation correction curve for the mode is set (step S208). On the other hand, if the ratio is not smaller than α2 (NO at step S204), it is determined further if a ratio of frequency sums of chromatic colors in a particular frequency block is very large or not (step S210). In concrete, a difference between a maximum and a minimum of sums in frequency blocks G30–G34 for chromatic dots to the sum S of total dots is calculated, and if the ratio is not smaller than a reference value α3 (NO at step S210), the document is determined to be a color standard document having a colored background (step S216) because the image data is not average over all value gradation levels. Then, as to image processing, standard manual exposure is adopted and the exposure level is set at the center as a default value for manual setting, the document mode is set as a color standard mode, black character discrimination is set and a gradation correction curve for the mode is set (step S218). On the other hand, if the ratio is smaller than a reference value α3 (YES at step S210), the document is determined to be a color photograph document (step S212) because the image data is average over all value gradation levels. Then, as to image processing, photograph manual exposure is adopted and exposure level is set at the center as a default, the document mode is set as a color photograph mode, black character discrimination is not set, and a gradation correction curve is not changed (step S214).

If the result of the automatic color selection is determined not a color document (NO at step S202), the flow proceeds to step S220 to discriminate black documents (1)–(2) with a reference number α1. Then, if a ratio of a sum of frequencies of achromatic dots of 0.4 or more of output data ID to the sum S of total dots is smaller than α1 (YES at step S220), the document is determined to be a black-and-white photograph document (step S222). Then, as to image processing, photograph manual exposure is adopted and the level is set at the center as a default value, the document mode is set as a black photograph mode, black character discrimination is not set, and a gradation correction curve is not changed (step S224). On the other hand, if the ratio is not smaller than is α1 (NO at step S220), the document is determined to be black-and-white standard document (step S226). Then, as to image processing, automatic exposure is set, the document mode is set as a black standard mode, black character discrimination is not set, and a gradation correction curve for the mode is changed (step S228).

Finally, the result of the determination of document type is displayed in the basic operation picture (refer to FIG. 3) of the operational panel 154 (step S230). Because document type is displayed in the operational panel 154, a user can recognize the result of the determination readily. If this were not displayed, a user may become uneasy.

In the processing explained above, five document types (1)–(5) can be distinguished, and image processing is set according thereto. Table 1 shows contents of automatic color selection (ACS), image processing and document mode, and Table 2 shows background processing in the modes.

TABLE 1

Document type and image processing

| Document type | ACS | Background | Black characters discrimination | Gradation change | Document mode |
|---|---|---|---|---|---|
| Color standard (colored background) | Color | Manual (Standard) Center | Yes | Yes | Color standard |

TABLE 1-continued

Document type and image processing

| Document type | ACS | Background | Black characters discrimination | Gradation change | Document mode |
|---|---|---|---|---|---|
| Color standard (white background) | Color | AE | No | Yes | Color standard |
| Color photograph | Color | Manual (Photograph) Center | Yes | No | Color photograph |
| Black-and-white standard | Black | AE | No | Yes | Black standard |
| Black-and-white photograph | Black | Manual (Photograph) Center | No | No | Black photograph |

TABLE 2

Background processing

| AE | | Black: Vout = 256* (Vin-8-b)/{(a-8)-b} Color: Vout = 256* (Vin-8)/(a-8) | |
|---|---|---|---|
| Manual level | +2 | Color standard: | Vout = 256* (Vin-8)/(256-8) |
| | | Black standard: | Vout = 256* (Vin-16)/(256-16) |
| | | Photograph: | Vout = 256* (Vin-8)/(256-8) |
| | +1 | Color standard: | Vout = 256* (Vin-8)/(240-8) |
| | | Black standard: | Vout = 256* (Vin-16)/(240-16) |
| | | Photograph: | Vout = 256* (Vin-8)/(244-8) |
| | ±0 | Color standard: | Vout = 256* (Vin-8)/(224-8) |
| | | Black standard: | Vout = 256* (Vin-16)/(224-16) |
| | | Photograph: | Vout = 256* (Vin-8)/(232-8) |
| | −1 | Color standard: | Vout = 256* (Vin-8)/(208-8) |
| | | Black standard: | Vout = 256* (Vin-16)/(208-16) |
| | | Photograph: | Vout = 256* (Vin-8)/(220-8) |
| | −2 | Color standard: | Vout = 256* (Vin-8)/(192-8) |
| | | Black standard: | Vout = 256* (Vin-16)/(192-16) |
| | | Photograph: | Vout = 256* (Vin-8)/(208-8) |
| | −3 | Color standard: | Vout = 256* (Vin-8)/(176-8) |
| | | Black standard: | Vout = 256* (Vin-16)/(176-16) |
| | | Photograph: | Vout = 256* (Vin-8)/(196-8) |
| | −4 | Color standard: | Vout = 256* (Vin-8)/(160-8) |
| | | Black standard: | Vout = 256* (Vin-16)/(160-16) |
| | | Photograph: | Vout = 256* (Vin-8)/(184-8) |
| | −5 | Color standard: | Vout = 256* (Vin-8)/(144-8) |
| | | Black standard: | Vout = 256* (Vin-16)/(144-16) |
| | | Photograph: | Vout = 256* (Vin-8)/(176-8) |

In an example of the determination of document type described above, automatic color selection is performed first to determine a color document and a black-and-white document. Then, a standard document (including a document with a white background and with a colored background) and a photograph document are determined next. However, the determination of document type may be performed in a different way. For example, if the existence of the background is determined according a frequency sum in the same value range is adopted in a step in correspondence to steps S204 and 220, it is possible to determine a standard document (having a white background) and a photograph document independently of the determination of a color document or a black-and-white document.

G. HVC Conversion and HVC Control

The copying machine of the embodiment processes image data by using conversion of data of red (R), green (G) and blue (B) to HVC data. The HVC converter 114 has a matrix operator for converting the R, G and B data to value signal (V) and two kinds of color difference signals (Cr and Cb).

$$\begin{pmatrix} V \\ Cr \\ Cb \end{pmatrix} = \begin{pmatrix} 0.31640625 & 0.65625 & 0.02734375 \\ 1 & -0.9609375 & -0.0390625 \\ -0.32421875 & -0.67578125 & 1 \end{pmatrix} * \begin{pmatrix} R \\ G \\ B \end{pmatrix} \quad (4)$$

Three attributes of value, chroma and hue of image are obtained as follows by using the signals V, Cr and Cb:

Value=V,

Chroma=$(Cr^2+Cb^2)^{1/2}$

Hue=arctan(Cb/Cr). (5)

The conversion to signals V, Cr and Cb is used to improve image quality by adopting processing similar to human sense and to facilitate processing needed later such as image synthesis, automatic exposure and HVC adjustment.

The HVC converter 114 sends signals to the edition processor 118 as well as to the image synthesis section 124. The edition processor 118 performs edition of image such as color change. In the image synthesis section 124, the signals received from the HVC converter 114 are stored once in a delay memory 116 so as to synchronize them with image signals received from the edition processor 118. Then, the image synthesis section 124 synthesizes the output data V, Cr and Cb received from the delay memory 116 with the output data V, Cr and Cb of the edition processor 118 received through the image selector 126. Image synthesis performed by the image synthesis section 124 includes for example synthesis by adding the two images and synthesis of characters.

Figure 10:
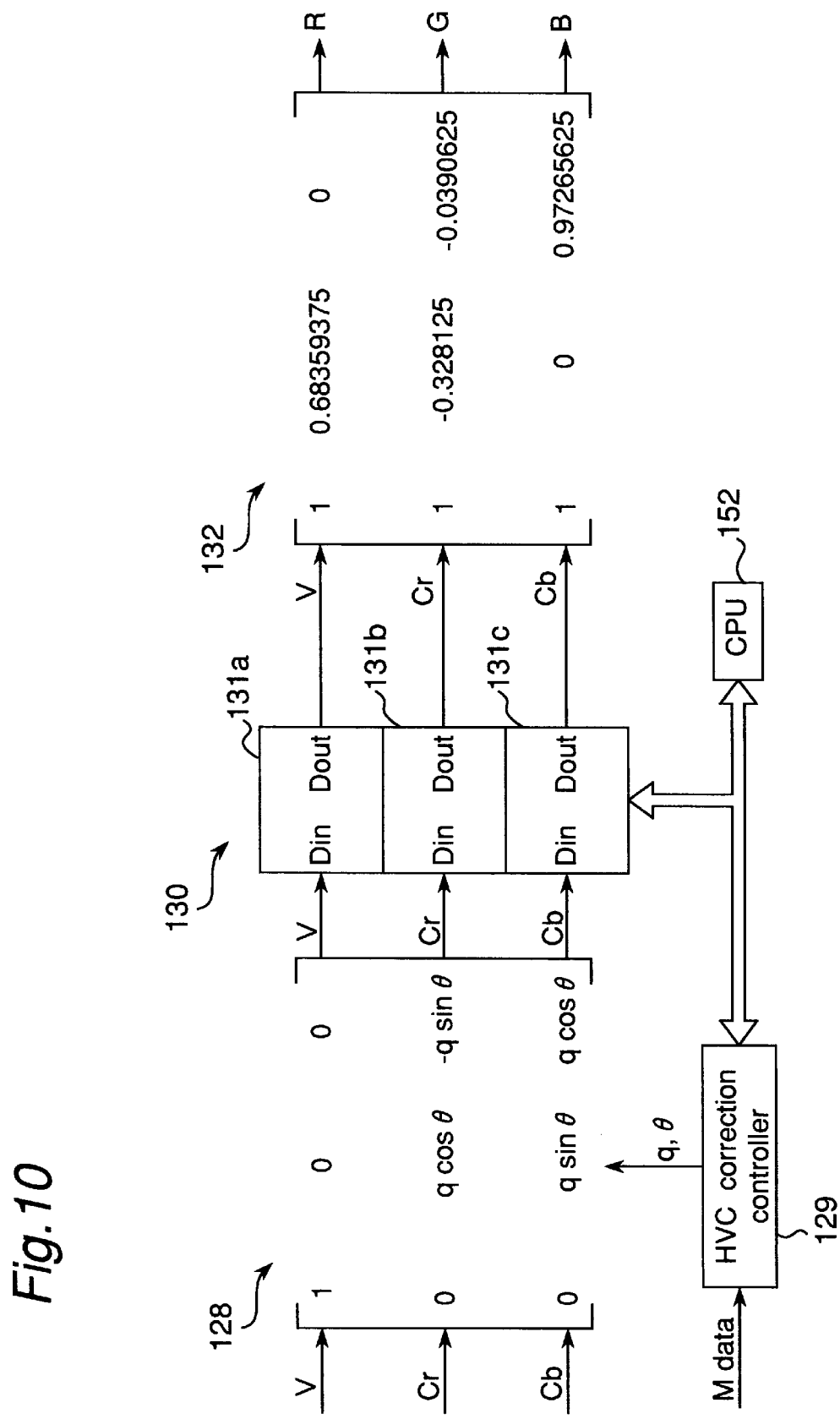
FIG. 10 is a block diagram of an HVC controller, an automatic exposure processor and a reverse HVC converter.

The HVC correction unit 128 shown in FIG. 10 is provided for controlling image quality. In order to control image for each of received signals H, V and C, the HVC correction unit 128 comprises a matrix operator for performing a matrix operation as shown below:

$$\begin{pmatrix} V \\ Cr \\ Cb \end{pmatrix} = \begin{pmatrix} 1 & 0 & 0 \\ 0 & q*\cos\theta & -q*\sin\theta \\ 0 & q*\sin\theta & q*\cos\theta \end{pmatrix} * \begin{pmatrix} V \\ Cr \\ Cb \end{pmatrix} \quad (6)$$

wherein "q" denotes a chroma control coefficient and θ denotes a hue control coefficient. These coefficients are output by the HVC correction unit 128 wherein they are selected from among eight groups of coefficients according to 3-bit M data signal set by a user with the operational panel 154. Thus, the image can be corrected by a user.

H. Automatic Exposure (AE)

Background processing is explained as an example of processing using document type determined in a prescan. In this embodiment, value signal VH which resembles human luminous efficiency (brightness) is generated. Then, histograms of the value signal VH are generated, as explained before, and document type is determined by using the histograms. The background can be processed automatically according to the document type without changing color balance of a full color document. It can also be processed appropriately without special adjustment for a document including color and black images therein by discriminating the areas of the color and black images in a prescan. Image signals R, G and B are once converted to signals V, Cr and Cb, and automatic exposure is performed on the signals V, Cr and Cb. Then, the signals V, Cr and Cb are converted again to image signals R, G and B. Thus, the background level can be adjusted appropriately in the automatic exposure by determining it uniquely both for the full color mode and for the black mode. In the full color mode, because color component signals Cr and Cb are not subjected to any processing, color balance is not affected by the automatic exposure.

In concrete, background adjustment is performed by automatic exposure or by setting an exposure level manually. In the basic picture shown in FIG. 3, a user can select automatic exposure or a manual setting of an exposure level from among eight levels. In the automatic exposure, five document types are discriminated according to document histogram information obtained in a prescan of a document, as explained above. As shown in FIG. 8, if the document type is color standard document (with white background) or black-and-white document, value gradation level is corrected as shown in FIGS. 11 and 12, while as to the other three document types, the center level of manual setting is set automatically as a default level (refer to Table 1).

In the automatic exposure section 130, background is deleted according to document type determined with the histogram generator 110. As to two document types of color standard document (white background) and black-and-white documents, a look up table (AE table) 131a on value signal is used to obtain a value signal $V_{out}$ after automatic exposure based on an input value signal $V_{in}$ before automatic exposure according to correction formulas explained below. That is, as to document type of black-and-white document, $$V_{out}=256*(V_{in}-b-8)/\{(a-8)-b\}, \quad (7)$$

and, as to document type of color standard document (with white background), $$V_{out}=256*(V_{in}-8)/(a-8), \quad (8)$$

wherein "a" denotes background level and "b" denotes character level. As to a black-and-white document, background is removed, and characters with light densities are made darker, as shown in FIG. 11. That is, value signals between a+8 to b are expanded in a wider range between 0 and 255 so as to delete input signals $V_{in}$ below a+8 and above b. On the other hand, as to a color document with white background, only the background is removed. That is, as shown in FIG. 12, value signals between 8 to b are expanded in a wider range between 0 and 255 so as to delete input signals $V_{in}$ above b. In this example, levels for deleting background are set at 0–8.

The background level "a" and the character level "b" are determined as described below. By using the value histogram hl(n) on the entire document obtained in the first histogram memory 202, a gradation level "m" having the maximum frequency h1(m) is determined in a range of n =136–255 (or ID of 0.4 or less). Then, "a" is set as m −8, and background value is set as 255. The histogram distribution around the level "m" will have a normal distribution with a scattering, and the scattering is set as ±8 in this example to delete gradations around the level "m" surely by setting "a" as m−8. Similarly, only for a black-and-white document, a gradation level "l" having the maximum frequency h1(l) is determined in a range of n=0–120 (or ID of 0.4 or more). Then, "b" is set as l+8, and the value of a character is set as 0. Gradation around the level "l" can be made black surely by setting "b" as l+8. As to a color standard document with white background, "b" is not used for automatic exposure because characters may not necessarily be black.

Because color difference signals Cr and Cb or color information are not changed (or $D_{in}=D_{out}$ in tables 131b and 131c) in the automatic exposure section 130, only darkness (V) is controlled, and color balance is not affected. That is, background level is controlled automatically without changing color information of a color document.

In the manual setting mode using the operational panel 154, the value signal is corrected to change background level. As shown in FIG. 3, seven levels from +2 to +1 and from −1 to −5 can be set manually at dark and light sides with respect to the center level (0). The steps at positive (dark) side means enhancement of background, while those at negative (light) side means deletion of background. Table 2 shows examples of background processing at each level from +2 to −5 for each mode of the three document types: color standard mode, black standard mode and photograph mode.

When a document includes a color area and a black area, it is desirable that gradation expression after background processing is continuous between the areas. Then, beside the histogram analysis, features of input image are extracted in a prescan to determine image areas in a document. In an image area of color standard document type, gradation correction is performed according to Eq. (8), and in an image area of black-and-white standard document type, gradation correction is performed according to Eq. (7). Because Eqs. (7) and (8) are similar to each other, gradation expression is smooth even if the background is processed differently in the two types of areas.

The black character discrimination (color blur) processing by the MTF correction section 148 is another image processing performed in correspondence to document type. As shown in Table 1, this processing is performed on a color standard document in order to optimize image reproduction of black characters when a color image and a black-and-white image are included in a document. First, in an area for which the region discrimination section 146 determines to be an edge, the data of cyan, magenta and yellow are decreased, while the data of black is increased for edge emphasis to broaden the characters somewhat by adding a value data V to 100% of the black data Bk.

The reverse HVC converter 132 converts the signals V, Cr and Cb again to signals R, G and B by using a following an inverse matrix operation:

$$\begin{pmatrix} R \\ G \\ B \end{pmatrix} = \begin{pmatrix} 1 & 0.69359375 & 0 \\ 1 & -0.328125 & -0.0390625 \\ 1 & 0 & 0.97265625 \end{pmatrix} * \begin{pmatrix} V \\ Cr \\ Cb \end{pmatrix} \quad (9)$$

After this reverse conversion, data processing can be performed on data of three primary colors.

I. Modified Embodiment

Next, a second embodiment of the invention is explained. In the above-mentioned embodiment, achromatic dots are detected, and histograms on the achromatic dots and on the entire document are generated. However, at edges of characters and linear images in a document, it is liable to detect achromatic dots erroneously as chromatic errors, and this deteriorates precision of analysis of the histogram of achromatic dots. Thus, in this embodiment, the histogram is generated on dots except at edges by providing an edge detection circuit in order to improve precision of analysis based on the histogram, so that a more appropriate processing is performed.

Figure 13:
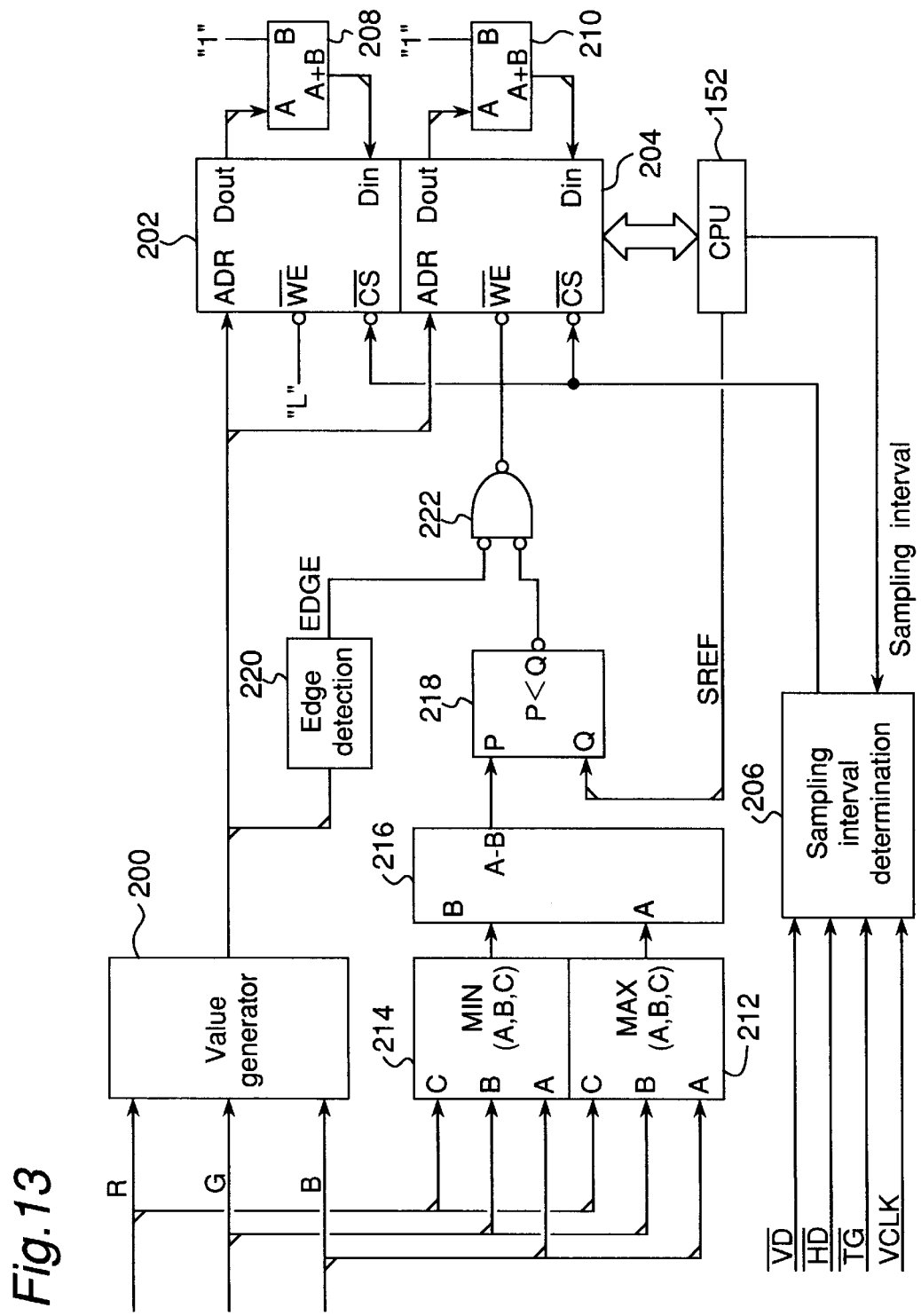
FIG. 13 is a block diagram of a modified example of a histogram generator.

This embodiment is different from the first embodiment only in a structure of a histogram generator shown in FIG. 13. This histogram generator is the same as that shown in FIG. 4 except that an edge detection circuit 220 and an AND gate 222 of negative logic are added. Various edge detection circuits are known to detect an edge on image signals supplied successively, and the structure of the edge detection circuit 220 is not explained explicitly for the brevity of explanation.

Similarly to the histogram generator shown in FIG. 4, two histogram memories 202 and 204 are used. In a prescan, a sampling interval circuit 206 determines sampling intervals for storing data in the histogram memories 202 and 204. When an address ADR is sent to the histogram memories 202, 204, data in the histograms at the address are read, and they are added by adders 208, 210 by one. The sums are written to the histogram memories 202, 204 at the same address. An address of the memories 202 and 204 represents a gradation level (value), and data thereof represents the frequency of occurrence of each gradation level. After a prescan is completed, the CPU 152 reads gradation data from the histogram memories 202 and 204 for various processing such as automatic exposure and automatic color selection to be explained later.

Next, input data to the histogram 204 is explained. The edge detection circuit 220 received a value signal VH from the value generator 200 and detects an edge. If an edge is detected, it sends a signal EDGE to one of the inputs of the AND gate 222. On the other hand, a minimum circuit 212 and a maximum circuit 214 detect a minimum (MIN) and a maximum (MAX) of the input R, G and B data, and a subtraction circuit 216 calculates a difference between them. Then, a comparator 218 compares the difference (MAX −MIN) with a reference level SREF, and if the difference is smaller than the reference level or if the dot is achromatic, the data is sent to the other input of the AND gate 222. The output of the AND gate 222 is sent to $\overline{WE}$ input of the second histogram memory 204. The edge detection circuit 220 outputs a signal of L level for a dot at an non-edge portion, while the comparator 218 outputs a signal of L level for achromatic dots. Therefore, the AND gate outputs a signal of L level for an achromatic dot at a non-edge portion. That is, the second histogram memory 204 is allowed to be written only for an achromatic dot at a non-edge portion, and a histogram of achromatic dots at non-edge portions is generated. On the other hand, it is noted that data on all the dots can be written to the first histogram memory 202 because the $\overline{WE}$ input thereof is always kept at L level. That is, the first histogram generates a histogram of value on the entire document simply.

After the prescan is completed, the CPU 152 reads the histograms from the memories 202 and 204. Then, as explained above in the first embodiment, automatic exposure and automatic color selection are performed based on analysis of the histogram data, and detailed explanation thereof is omitted here. Thus, image processing can be performed more precisely because a histogram on achromatic dots at non-edge portions is used.

In the embodiments described above, a full color document or a black-and-white document is selected automatically according to histograms on value signals. If a monochromatic document different than a black-and-white document is reproduced, the embodiments can be modified to select a full color document and a monochromatic document automatically. In this case, dots of the monochromatic color are detected and a histogram of the monochromatic dots is generated. Then, the document type can be selected automatically in a similar way, and image processing can be performed also in a similar way.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising:
   a converter for converting digital signals of red, green and blue of an image of a document to a value signal;
   a first operation means for generating a first histogram of achromatic dots in the image from the value signal obtained by said converter;
   a second operation means for generating a second histogram of chromatic dots in the image from the value signal obtained by said converter, said first and second histograms each comprising frequency data for a plurality of value levels for said corresponding value signals; and
   a decision means for deciding a document type of the document according to frequency distributions of the first and second histograms generated by said first and second operation means.

2. An image processing apparatus in accordance with claim 1, wherein said value signal is a function of each of said signals of red, green and blue, a functional contribution of said signals of red, green and blue each being greater than zero.

3. An image processing apparatus in accordance with claim 2, wherein said value signal is a function of each of said signals of red, green and blue in accordance with:

$$V=a*R+b*G+c*B$$

where
   V corresponds to the value signal,
   R, G and B correspond to the digital signals of red, green and blue respectively of an image of a document, and
   a, b, and c correspond to weighting factors corresponding respectively to the contribution of each of the digital signals of red, green and blue to the value function.

4. An image processing apparatus in accordance with claim 3, wherein:
   a is about 0.3;
   b is about to 0.6;
   c is about 0.1; and
   a+b+c is substantially equal to 1.0.

5. An image processing apparatus comprising:
   a converter for converting digital signals of red, green and blue of an image of a document to a value signal;
   a first operation means for generating a first histogram of achromatic dots in the image from the value signal obtained by said converter;
   a second operation means for generating a second histogram of chromatic dots in the image from the value signal obtained by said converter; and
   a decision means for deciding a document type of the document according to the first and second histograms generated by said first and second operation means;
   wherein said decision means includes a first sum means for obtaining a first sum of frequencies of colored dots from the second histogram and a second sum means for obtaining a second sum of all the frequencies in the first histogram, and wherein said decision means decides that the document type is a color document it a ratio of the first sum to the second sum is larger than a predetermined value and a black-and-white document otherwise.

6. The apparatus according to claim 5, wherein said second sum means further adds all the frequencies in the second histogram.

7. The apparatus according to claim 6, wherein said decision means includes a third sum means for obtaining a third sum of all the frequencies in the first and second histograms and a fourth sum means for obtaining a fourth sum of frequencies of dots from the first and second histograms, excluding frequencies of dots from a region around a highest value, and wherein said decision means decides that the document type is a document having a white background if a ratio of the third sum to the fourth sum is smaller than a predetermined value.

8. The apparatus according to claim 7, wherein said decision means includes a means for obtaining sums for blocks defined by dividing a whole range of the value signal on a color document and a means for determining a maximum and a minimum among the sums of the blocks excluding a block near the highest value signal from the second histogram, and wherein said decision means decides that the document type is a color photograph document if a ratio of a difference between the maximum and the minimum of the sums for the blocks to the third sum is smaller than a predetermined value and that the document type is a color document having a colored background.

9. An image processing apparatus comprising:
a converter for converting digital signals of red, green and blue of an image of a document to a value signal;
a first operation means for generating a first histogram of achromatic dots in the image from the value signal obtained by said converter;
a second operation means for generating a second histogram of chromatic dots in the image from the value signal obtained by said converter
a decision means for deciding a document type of the document according to the first and second histograms generated by said first and second operation means; and
an edge detection means for detecting an edge in the image of the document, wherein said first operation means generates the first histogram of achromatic dots except achromatic dots which are detected by said edge detection means to be located in an edge.

10. An image processing apparatus comprising:
a converter for converting digital signals of red, green and blue of an image of a document to a value signal;
edge detection means for detecting an edge in the image of the document;
a first operation means for generating a first histogram of achromatic dots in the image from the value signal obtained by said converter, said first histogram excluding achromatic dots which are detected by said edge detection means to be located in an edge;
a second operation means for generating a second histogram of chromatic dots in the image from the value signal obtained by said converter; and
a decision means for deciding a document type of the document according to the first and second histograms generated by said first and second operation means;
wherein said decision means includes a first sum means for obtaining a first sum of all the frequencies in the first and second histograms and a second sum means for obtaining a second sum of all frequencies of dots in the first and second histograms, except frequencies of dots from a region around a highest value from the first and second histograms on a color document, and wherein said decision means decides that the document type is a document having a white background if a ratio of the first sum to the second sum is smaller than a predetermined value.

11. An image processing apparatus comprising:
a converter for converting digital signals of red, green and blue of an image of a document to a value signal;
edge detection means for detecting an edge in the image of the document;
a first operation means for generating a first histogram of achromatic dots in the image from the value signal obtained by said converter, said first histogram excluding achromatic dots which are detected by said edge detection means to be located in an edge;
a second operation means for generating a second histogram of chromatic dots in the image from the value signal obtained by said converter; and
a decision means for deciding a document type of the document according to the first and second histograms generated by said first and second operation means;
wherein said decision means includes a first sum means for obtaining a first sum of frequencies of colored dots from the second histogram and a second sum means for obtaining a second sum of all the frequencies in the first histogram, and wherein said decision means decides that the document type is a color document it a ratio of the first sum to the second sum is larger than a predetermined value and a black-and-white document otherwise.

12. The apparatus according to claim 11, wherein said decision means includes a third sum means for obtaining a third sum of all the frequencies in the first and second histograms and a fourth sum means for obtaining a fourth sum of frequencies of dots from the first and second histograms, excluding frequencies of dots from a region around a highest value, and wherein said decision means decides that the document type is a document having a white background if a ratio of the third sum to the fourth sum is smaller than a predetermined value.

13. An image forming apparatus comprising:
a converter for converting signals of red, green and blue of a document image obtained with a photoelectric conversion element to a value signal and color difference signals;
a histogram generator for generating histograms of the value signal of the image obtained by said converter;
a first decision means for deciding, based on the histograms generated by said histogram generator, if the document is a color document or a black-and-white document;
a gradation correction means for determining a white level background level and a maximum density level according to the histograms and for performing gradation correction on the value signal obtained by said converter according to at least the white level background level;
a data generator comprising a first data generating means for converting the value signal corrected by said gradation correction means and the color difference signals converted by said converter to signals of colors needed for forming a full color image and a second data generating means for converting the value signal corrected by said gradation correction means and the color difference signals converted by said converter to signals of black needed for forming a black-and-white image; and an image-forming means for forming an image by selecting the signals of colors the signals of black obtained by said data generator according to the decision by said first decision means.

14. The apparatus according to claim 13, wherein said gradation correction means performs gradation correction for a black document by expanding the value signals between the white level background level and the maximum density level to those between the largest and smallest levels of the value signal.

15. The apparatus according to claim 13, further comprising a second decision means for deciding a document type according to the histograms generated by said histogram generator; and an image processor for performing image processing of the signals of red, green and blue according to the document type determined by said second decision means.

16. An image forming apparatus comprising:

a converter for converting signals of red, green and blue of a document image obtained with a photoelectric conversion element to a value signal and color difference signals;

a histogram generator for generating histograms of the value signal of the image obtained by said converter;

a first decision means for deciding, based on the histograms generated by said histogram generator, if the document is a color document or a black-and-white document;

a gradation correction means for determining a white level background level and a maximum density level according to the histograms and for performing gradation correction on the value signal obtained by said converter according to at least the white level background level;

a second decision means for deciding if the document is a photograph document or not, wherein said gradation correction means does not perform gradation correction if said second decision means decides that the document is a photograph image;

a reverse converter for converting the value signal corrected by said gradation correction means and the color difference signals obtained by said converter to signals of red, green and blue;

a first data generator for converting the signals of red, green and blue obtained by said reverse converter to signals of colors needed for forming a full color image;

a second data generator for converting the signals of red, green and blue obtained by said reverse converter to signals of black needed for forming a black-and-white image; and an image-forming means for forming an image by selecting the signals of colors or the signals of black obtained by said first or second data generator according to the decision of the color document or the black-and-white document by said first decision means.

17. An image forming apparatus comprising:

a converter for converting signals of red, green and blue of a document image obtained with a photoelectric conversion element to a value signal and color difference signals;

a histogram generator for generating histograms of the value signal of the image obtained by said converter;

a first decision means for deciding, based on the histograms generated by said histogram generator, if the document is a color document or a black-and-white document;

a second decision means for deciding a document type according to the histograms generated by said histogram generator, wherein said second decision means includes a means for determining if the document is a photograph document or not;

an image processor for performing image processing of the signals of red, green and blue according to the document type determined by said second decision means;

a gradation correction means for determining a white level background level and a maximum density level according to the histograms and for performing gradation correction on the value signal obtained by said converter according to at least the white level background level, wherein said gradation correction means does not perform gradation correction if said second decision means determines that the document is a photograph document;

a reverse converter for converting the value signal corrected by said gradation correction means and the color difference signals obtained by said converter to signals of red, green and blue;

a first data generator for converting the signals of red, green and blue obtained by said reverse converter to signals of colors needed for forming a full color image;

a second data generator for converting the signals of red, green and blue obtained by said reverse converter to signals of black needed for forming a black-and-white image; and an image-forming means for forming an image by selecting the signals of colors or the signals of black obtained by said first or second data generator according to the decision of the color document or the black-and-white document by said first decision means.

18. An image processing apparatus comprising:

an image reader for reading a document and for generating image data;

a decision circuit for determining whether the document is a black-and-white document or color document based on the image data; and a density correction circuit, responsive to said decision circuit, to correct a density of said image data, said density correction circuit correcting the density of image data corresponding to a black-and-white document by a first correction process, and said density correction circuit correcting the density of image data corresponding to a color document by a second correction process;

wherein said first correction process is different from said second correction process.

19. The image processing apparatus of claim 18, wherein:

the density of image data ranges from light to dark;

said first correction process corrects the density of image data by shifting image data tending towards dark density to a darker density, and by shifting image data tending towards light density to a lighter density; and said second correction process corrects said density of image data by shifting only image data tending towards light density to a lighter density.

20. The image processing apparatus of claim 18, wherein said decision circuit includes a histogram generator which generates from said image data a first histogram of chromatic dots and a second histogram of achromatic dots, and wherein said decision circuit decides whether the document is a black-and-white document or color document based on said histograms.

21. An image processing apparatus comprising:
- a detecting circuit to read a series of image data, each image data including corresponding color separated data, said detecting circuit detecting the maximum and minimum of each color separated data;
- a decision circuit to decide if each image data is chromatic or achromatic based on a difference between the maximum and minimum of the corresponding color separated data;
- a value generating circuit which reads said series of image data and generates a value signal corresponding to each of the image data;
- a first histogram generating circuit which generates a first histogram of the value signals corresponding to all of the read image data; and
- a second histogram generating circuit which generates a second histogram of the value signals corresponding to the read image data which are decided as achromatic by said decision circuit.

22. The image processing apparatus as claimed in claim 21, wherein the color separated data consists of red, green and blue data.

23. The image processing apparatus as claimed in claim 21, further comprising:
- a categorizing means for categorizing the image data based on the first and second histograms into a specific category.

24. An image processing apparatus comprising:
- a converter for converting digital signals of red, green and blue of an image of a document to a value signal;
- a first operation means for generating a first histogram of achromatic dots in the image from the value signal obtained by said converter;
- a second operation means for generating a second histogram of chromatic dots in the image from the value signal obtained by said converter; and
- a decision means for deciding a document type of the document according to the first and second histograms generated by said first and second operation means;
- wherein said decision means includes a first sum means for obtaining a first sum of all the frequencies in the first and second histograms and a second sum means for obtaining a second sum of all frequencies of dots in the first and second histograms, except frequencies of dots from a region around a highest value from the first and second histograms on a color document, and wherein said decision means decides that the document type is a document having a white background if a ratio of the first sum to the second sum is smaller than a predetermined value.

25. The apparatus according to claim 24, wherein said decision means decides that the document type is a photograph document if the ratio of the first sum to the second sum is not smaller than a predetermined value.

26. The apparatus according to claim 25, wherein said decision means includes a third sum means for obtaining a third sum of frequencies of colored dots from the second histogram, and wherein said decision means decides that the document type is a color document if a ratio of the third sum to the second sum is larger than a predetermined value and a black-and-white document otherwise.

* * * * *

UNITED STATES PATENT AND TRADEMARK OFFICE
CERTIFICATE OF CORRECTION

PATENT NO : 6,118,895

DATED : September 12, 2000

INVENTOR(S): Yoshihiko HIROTA, Katsuhisa TOYAMA, and Takayuki NABESHIMA

It is certified that error appears in the above-identified patent and that said Letters Patent is hereby corrected as shown below:

Delete Fig. 1, and insert:

*Fig.1*

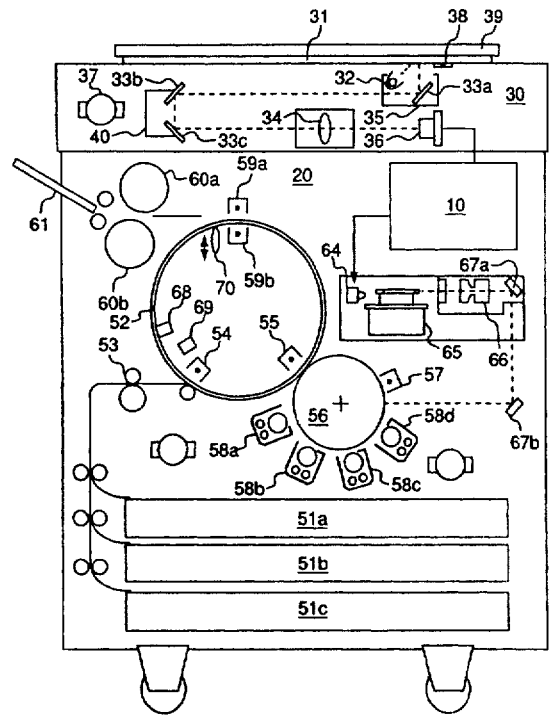

UNITED STATES PATENT AND TRADEMARK OFFICE
CERTIFICATE OF CORRECTION

PATENT NO : 6,118,895

DATED : September 12, 2000

INVENTOR(S): Yoshihiko HIROTA, Katsuhisa TOYAMA, and Takayuki NABESHIMA

It is certified that error appears in the above-identified patent and that said Letters Patent is hereby corrected as shown below:

Delete Fig. 2B, and insert:

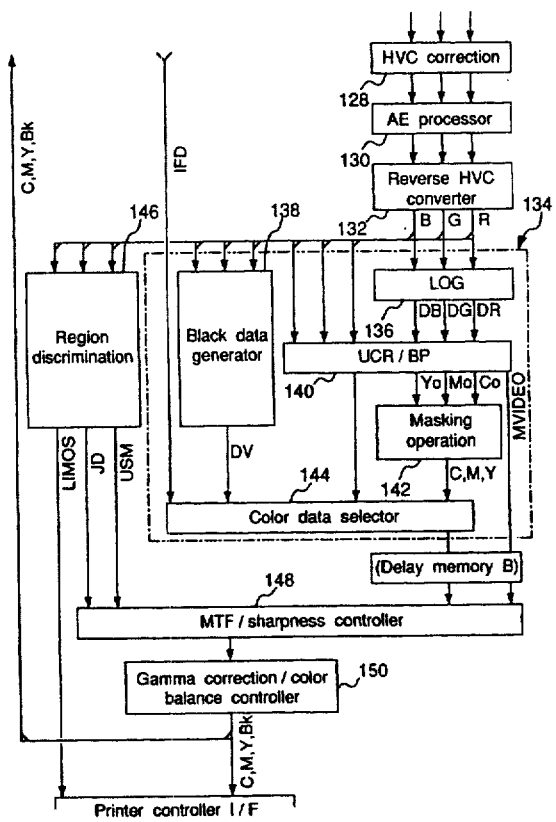

Fig.2B

UNITED STATES PATENT AND TRADEMARK OFFICE
CERTIFICATE OF CORRECTION

PATENT NO : 6,118,895

DATED : September 12, 2000

INVENTOR(S): Yoshihiko HIROTA, Katsuhisa TOYAMA, and Takayuki NABESHIMA

It is certified that error appears in the above-identified patent and that said Letters Patent is hereby corrected as shown below:

Delete Fig. 4, and insert:

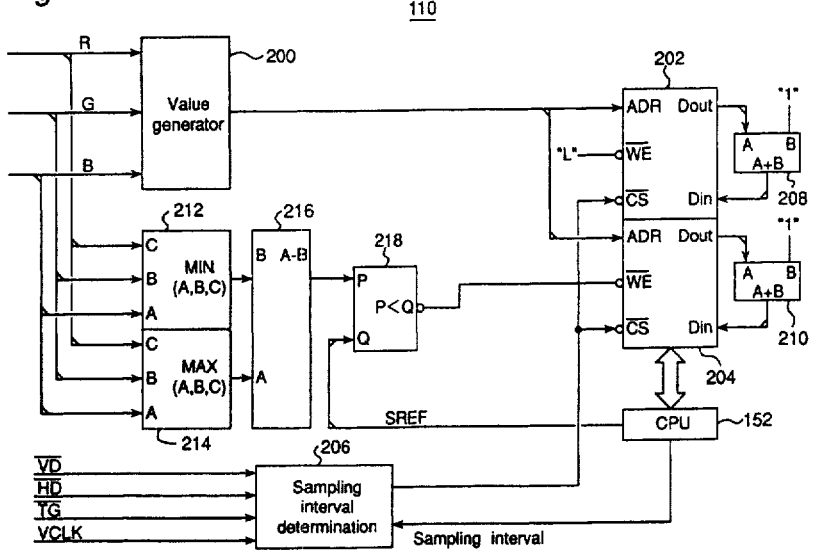

Fig.4

UNITED STATES PATENT AND TRADEMARK OFFICE
CERTIFICATE OF CORRECTION

PATENT NO : 6,118,895

DATED : September 12, 2000

INVENTOR(S): Yoshihiko HIROTA, Katsuhisa TOYAMA, and Takayuki NABESHIMA

It is certified that error appears in the above-identified patent and that said Letters Patent is hereby corrected as shown below:

Delete Fig. 8, and insert:

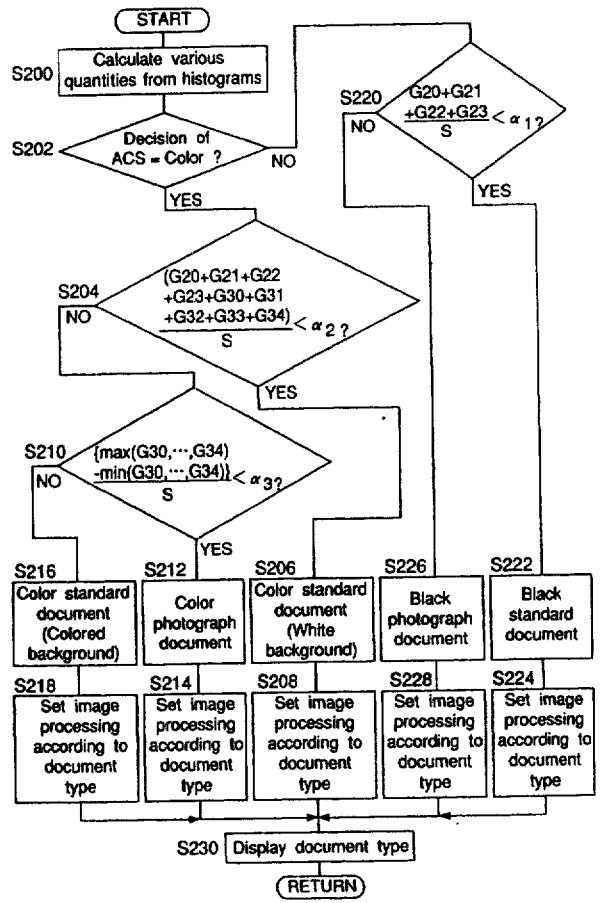

Fig.8

UNITED STATES PATENT AND TRADEMARK OFFICE
CERTIFICATE OF CORRECTION

PATENT NO : 6,118,895

DATED : September 12, 2000

INVENTOR(S): Yoshihiko HIROTA, Katsuhisa TOYAMA, and Takayuki NABESHIMA

It is certified that error appears in the above-identified patent and that said Letters Patent is hereby corrected as shown below:

Delete Fig. 10, and insert:

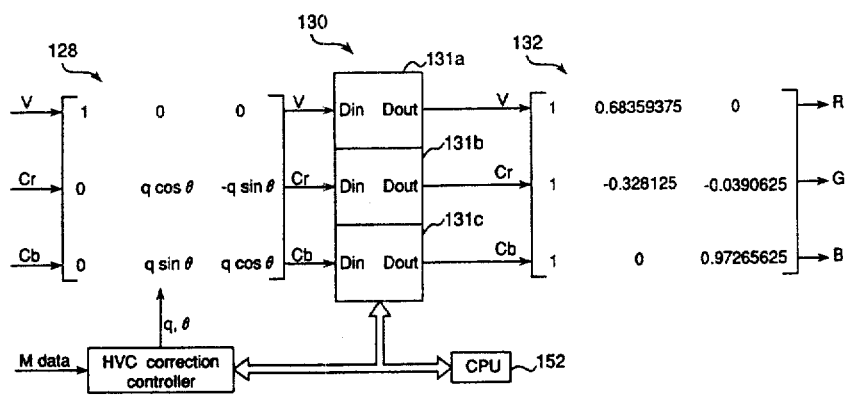

Fig.10

UNITED STATES PATENT AND TRADEMARK OFFICE
CERTIFICATE OF CORRECTION

PATENT NO : 6,118,895

DATED : September 12, 2000

INVENTOR(S): Yoshihiko HIROTA, Katsuhisa TOYAMA, and Takayuki NABESHIMA

It is certified that error appears in the above-identified patent and that said Letters Patent is hereby corrected as shown below:

Delete Fig. 13, and insert:

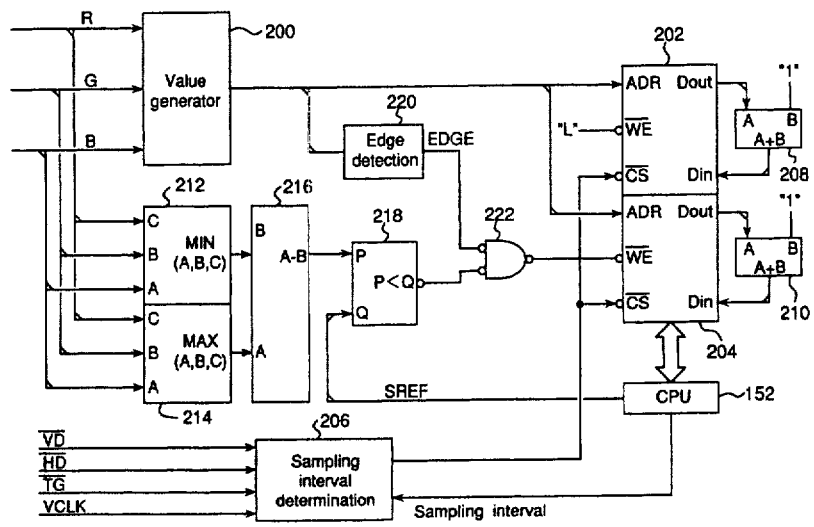

Fig.13

UNITED STATES PATENT AND TRADEMARK OFFICE
CERTIFICATE OF CORRECTION

PATENT NO. : 6,118,895
DATED : September 12, 2000
INVENTOR(S) : Yoshihiko HIROTA, et al.

It is certified that error appears in the above-identified patent and that said Letters Patent is hereby corrected as shown below:

Column 18, line 43 (claim 4, line 4), delete "to".

Column 18, line 64 (claim 5, line 18), delete "it", and insert --if--.

Column 19, line 4 (claim 7, line 1), delete "6", and insert --5--.

Column 20, line 27 (claim 11, line 22), delete "it", and insert --if--.

Column 21, line 2 (claim 13, line 29), after "colors", insert --or--.

Column 24, line 25 (claim 26, line 1), delete "25", and insert --24--.

Signed and Sealed this

Twenty-ninth Day of May, 2001

Attest:

NICHOLAS P. GODICI

*Attesting Officer*   *Acting Director of the United States Patent and Trademark Office*